(12) United States Patent
Shoji

(10) Patent No.: US 12,361,510 B2
(45) Date of Patent: Jul. 15, 2025

(54) IMAGE PROCESSING APPARATUS FOR OBTAINING FIRST AND SECOND CIRCULAR FISHEYE RAW IMAGES AND NOT PROCESSING PIXELS OUTSIDE OF THE FISHEYES

(71) Applicant: CANON KABUSHIKI KAISHA, Tokyo (JP)

(72) Inventor: Ryota Shoji, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 518 days.

(21) Appl. No.: 17/840,320

(22) Filed: Jun. 14, 2022

(65) Prior Publication Data
US 2022/0398688 A1 Dec. 15, 2022

(30) Foreign Application Priority Data

Jun. 15, 2021 (JP) .................. 2021-099616

(51) Int. Cl.
*G06T 3/047* (2024.01)
*H04N 7/18* (2006.01)
*H04N 13/156* (2018.01)

(52) U.S. Cl.
CPC ............. *G06T 3/047* (2024.01); *H04N 7/183* (2013.01); *H04N 13/156* (2018.05)

(58) Field of Classification Search
CPC .................. G06T 3/047; G06T 3/12
See application file for complete search history.

(56) References Cited

U.S. PATENT DOCUMENTS

| | | | | |
|---|---|---|---|---|
| 2012/0147148 | A1* | 6/2012 | Kusaka | H04N 23/6812 348/340 |
| 2017/0124398 | A1* | 5/2017 | Birkbeck | G06V 20/46 |
| 2019/0289201 | A1* | 9/2019 | Nishimura | H04N 13/00 |
| 2019/0356899 | A1* | 11/2019 | Oh | H04N 21/81 |
| 2019/0379877 | A1* | 12/2019 | Oh | H04N 13/139 |
| 2020/0267310 | A1* | 8/2020 | Zhang | G06T 3/047 |
| 2021/0158430 | A1* | 5/2021 | Buibas | H04B 3/02 |
| 2021/0321029 | A1* | 10/2021 | Guérin | G06T 3/4038 |
| 2022/0060677 | A1* | 2/2022 | Park | H04N 13/239 |

FOREIGN PATENT DOCUMENTS

| | | |
|---|---|---|
| JP | 2004040559 A | 2/2004 |
| JP | 2013141052 A | 7/2013 |
| JP | 2021005828 A | 1/2021 |

* cited by examiner

*Primary Examiner* — Benjamin O Dulaney
(74) *Attorney, Agent, or Firm* — Canon U.S.A., Inc. IP Division

(57) ABSTRACT

There is provided an image processing apparatus comprising: a processor; and a memory storing a program. When the program is executed by the processor, the program causes the image processing apparatus to: obtain a first RAW image including a region of a first circular fisheye image; and develop the first RAW image. A pixel outside the region of the first circular fisheye image in the first RAW image is not developed.

9 Claims, 16 Drawing Sheets

FIG. 10A

| |
|---|
| 1. LENS DESIGN VALUES |
| 2. INDIVIDUAL LENS VALUES (MANUFACTURING ERROR VALUES) |
| 3. LENS FLAG |
| 4. LENS FOCAL LENGTH (IN UNITS OF DECIMAL POINTS) |
| 5. LENS THERMOMETER INFORMATION |

FIG. 10B

| LENS DESIGN VALUES |
|---|
| 1. IMAGE CIRCLE POSITION |
| 2. IMAGE CIRCLE DIAMETER |
| 3. ANGLE OF VIEW |
| 4. DISTORTION CORRECTION COEFFICIENT |
| |
| INDIVIDUAL LENS VALUES (MANUFACTURING ERROR VALUES) |
| 5. IMAGE CIRCLE POSITION SKEW |
| 6. OPTICAL TILT |
| 7. IMAGE MAGNIFICATION SKEW |

FIG. 10C

| CAMERA OBTAINMENT VALUES |
|---|
| 1. CAMERA RECORDING REGION INFORMATION |
| 2. IN-CAMERA ACCELEROMETER INFORMATION |
| 3. APERTURE VALUE RIGHT EYE CORRECTION INFORMATION |

FIG. 11A
FIG. 11B
 : MISSING REGION

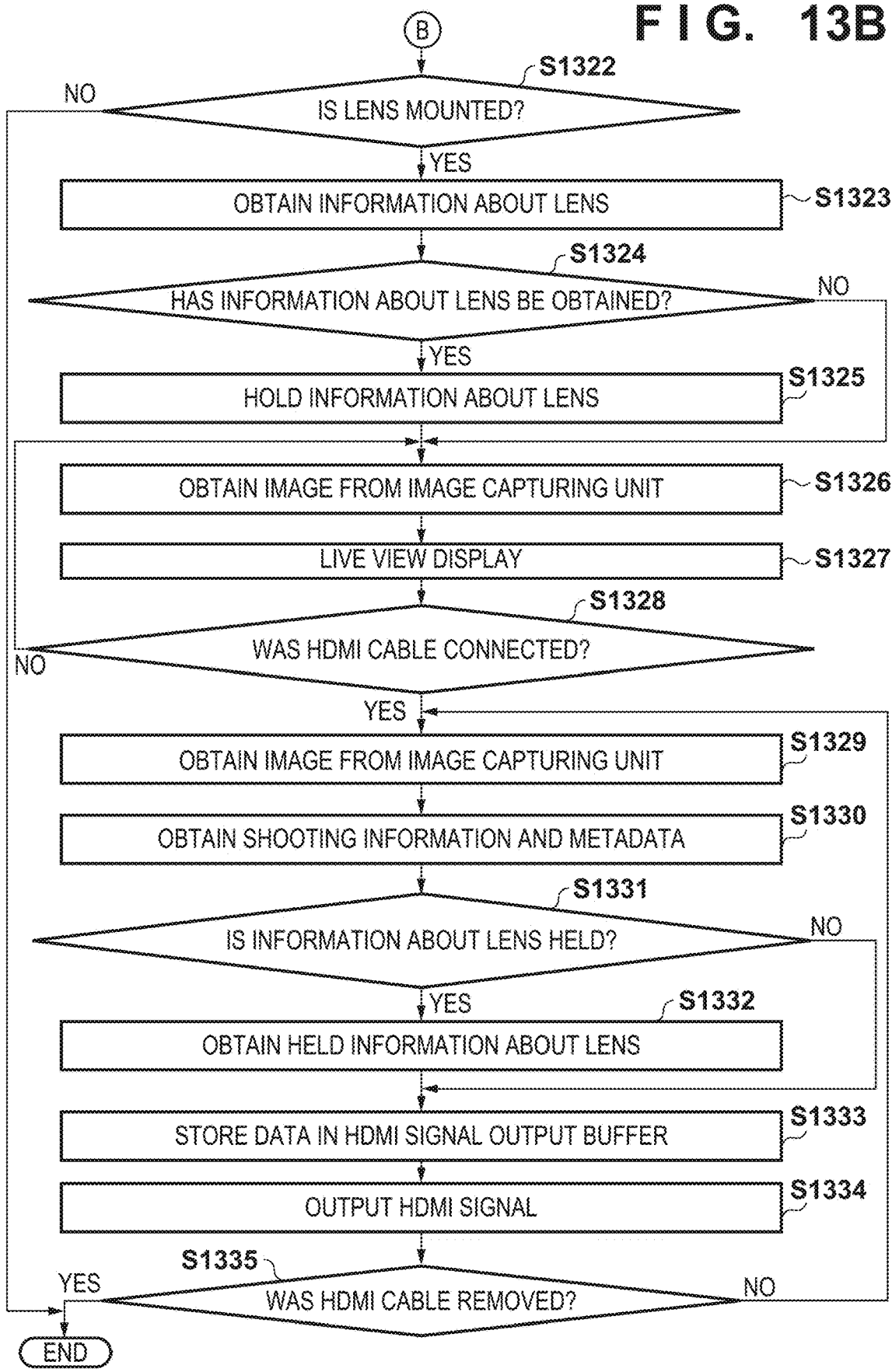

IMAGE PROCESSING APPARATUS FOR OBTAINING FIRST AND SECOND CIRCULAR FISHEYE RAW IMAGES AND NOT PROCESSING PIXELS OUTSIDE OF THE FISHEYES

BACKGROUND

Field of the Disclosure

The present disclosure relates to an image processing apparatus, an image processing method, and a storage medium.

Description of the Related Art

A technique is known in which two cameras are used to shoot circular fisheye images with parallax and the shot parallax images are reproduced as a three-dimensional virtual reality (VR) image. An apparatus is also known which has two optical systems on a single lens mount, and which can shoot images with parallax at one time (Japanese Patent Laid-Open No. 2013-141052). A camera is also known which can shoot an image in RAW format (RAW image).

To reproduce a RAW image including a circular fisheye image region as a VR image, it is necessary to perform both developing processing and equirectangular projection. This places a relatively high processing load on an image processing apparatus such as a personal computer (PC), and a technique for lightening such a processing load has thus far not been known.

SUMMARY

Having been achieved in light of such circumstances, the present disclosure provides a technique for lightening the processing load of processing for developing a RAW image including a circular fisheye image region.

According to a first aspect of the present disclosure, there is provided an image processing apparatus comprising: a processor; and a memory storing a program which, when executed by the processor, causes the image processing apparatus to: obtain a first RAW image including a region of a first circular fisheye image; and develop the first RAW image, wherein a pixel outside the region of the first circular fisheye image in the first RAW image is not developed.

According to a second aspect of the present disclosure, there is provided an image processing method executed by an image processing apparatus comprising: obtaining a first RAW image including a region of a first circular fisheye image; and developing the first RAW image, wherein a pixel outside the region of the first circular fisheye image in the first RAW image is not developed.

According to a third aspect of the present disclosure, there is provided a non-transitory computer-readable storage medium which stores a program for causing a computer to execute an image processing method comprising: obtaining a first RAW image including a region of a first circular fisheye image; and developing the first RAW image, wherein a pixel outside the region of the first circular fisheye image in the first RAW image is not developed.

Further features of the present disclosure will become apparent from the following description of exemplary embodiments with reference to the attached drawings.

BRIEF DESCRIPTION OF THE DRAWINGS

FIGS. 10A and 10B are diagrams illustrating information obtained from the VR180 lens 300.

FIG. 10C is a diagram illustrating information obtained from the camera 100.

FIGS. 11A and 11B are diagrams illustrating examples of images shot and recorded by the camera 100 to which the VR180 lens 300 is mounted.

FIG. 13B is a flowchart illustrating video signal output processing by the camera 100 according to one or more aspects of the present disclosure.

DESCRIPTION OF THE EMBODIMENTS

Figure 1A:
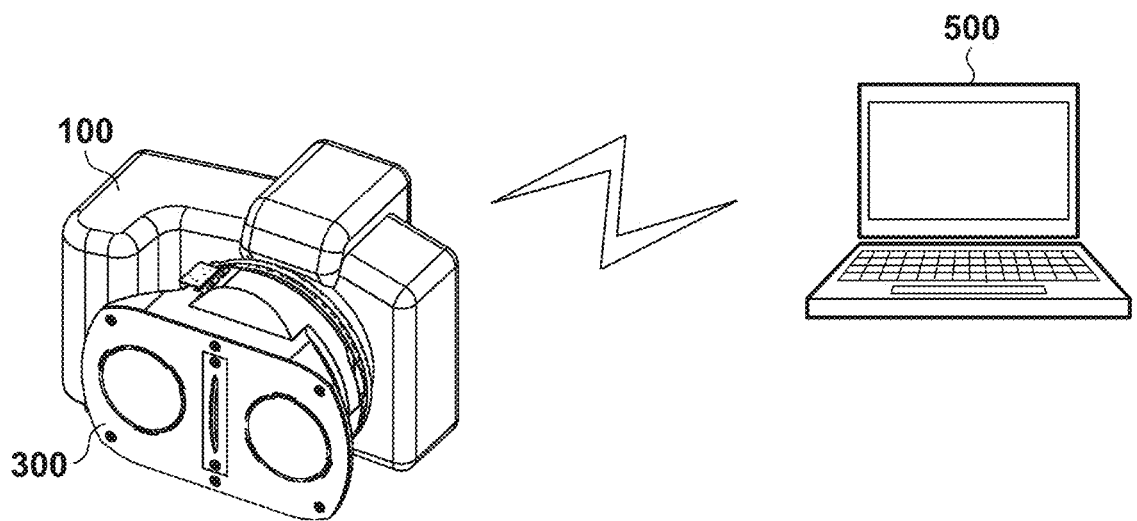
FIGS. 1A and 1B are diagrams illustrating the overall configuration of a system according to one or more aspects of the present disclosure.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

Overall System Configuration

Figure 1B:
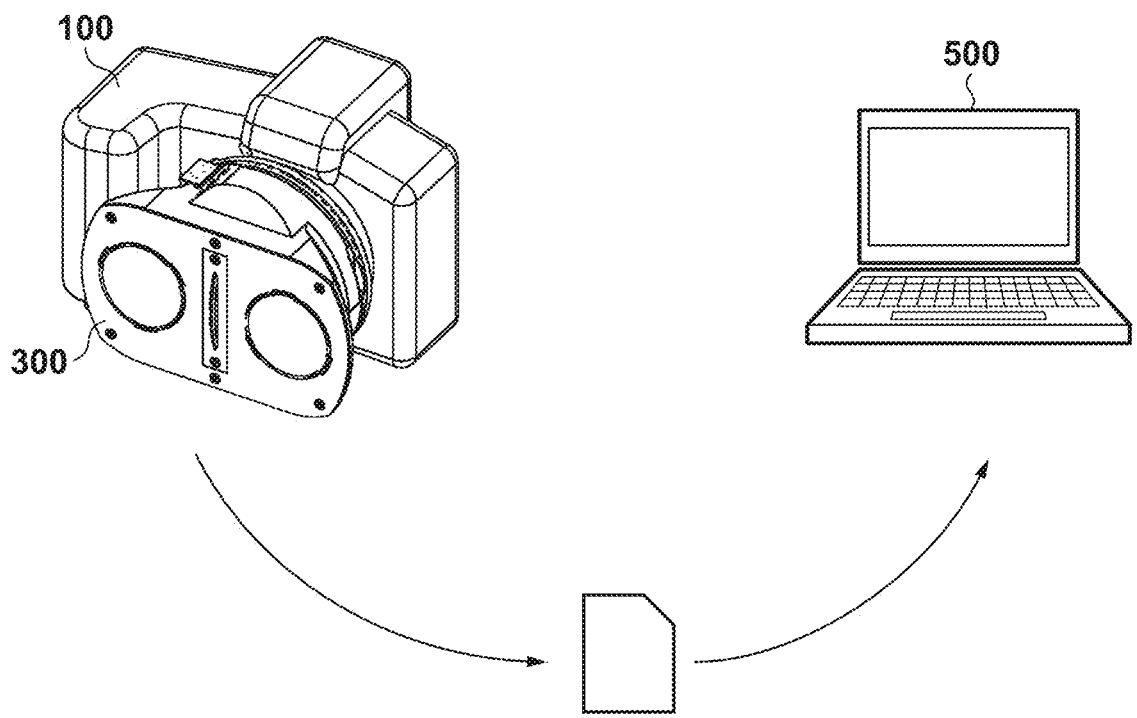

FIGS. 1A and 1B are diagrams illustrating the overall configuration of a system according to a first embodiment.

In FIGS. 1A and 1B, 100 indicates a digital camera (called simply a "camera" hereinafter) capable of shooting images in RAW format (still images in RAW format or moving images in RAW format). 300 indicates a VR180 lens that can be mounted on the camera 100. The VR180 lens 300 is a binocular lens, and an image having parallax can be obtained by the camera 100, to which the VR180 lens 300 is mounted, shooting an image. The VR180 lens 300 is a lens for capturing images for what is known as "VR180", a format of VR images that enables binocular stereoscopic viewing and has a 180-degree visual field.

500 indicates a personal computer (PC), which is an example of an image processing apparatus that processes images captured by the camera 100. The method by which the PC 500 obtains images from the camera 100 is not limited. For example, as illustrated in FIG. 1A, the PC 500 may obtain images from the camera 100 through wireless communication. Alternatively, as illustrated in FIG. 1B, the PC 500 may obtain an image recorded as a file via an external storage apparatus (e.g., a memory card) of the camera 100.

Configuration of Camera 100

Figure 2A:
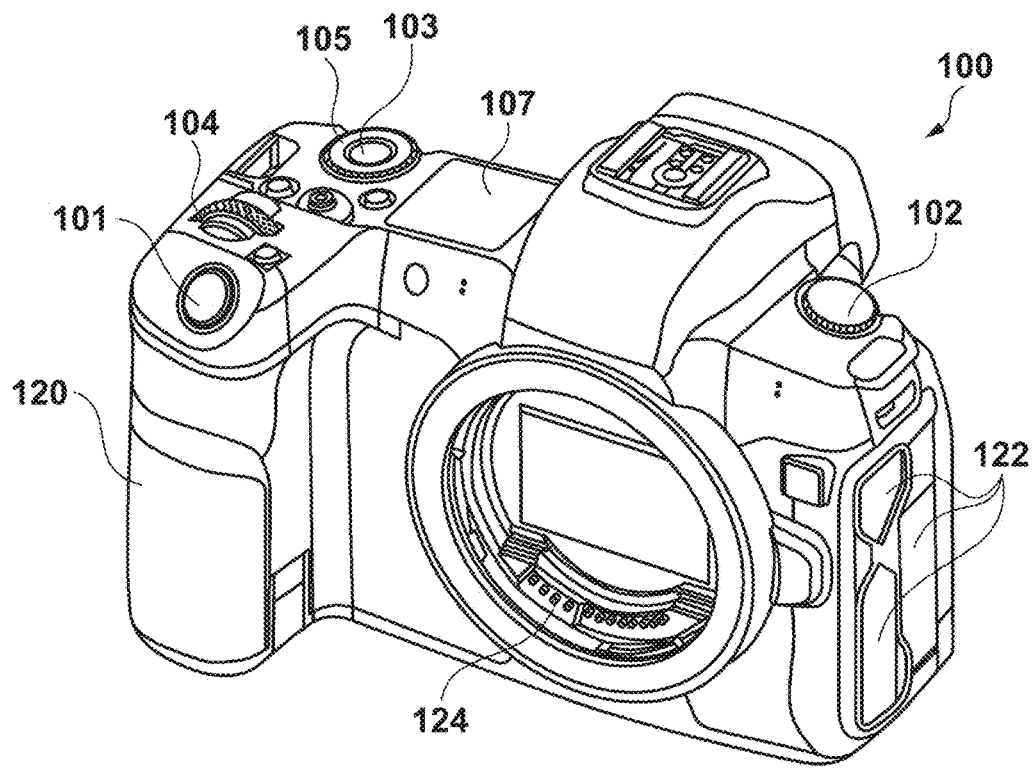
FIGS. 2A and 2B are diagrams illustrating the external appearance of a camera 100.
Figure 2B:
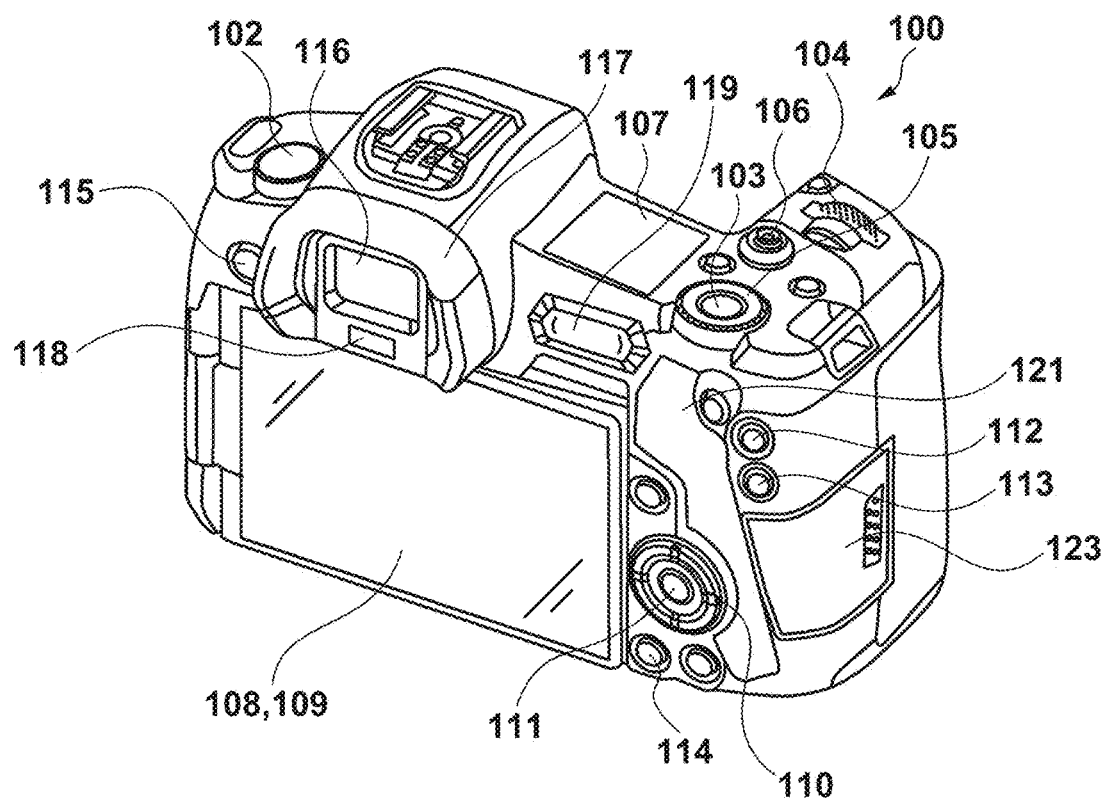

FIGS. 2A and 2B are diagrams illustrating the external appearance of the camera 100. FIG. 2A is a perspective view of the camera 100 seen from the front, and FIG. 2B is a perspective view of the camera 100 seen from the rear.

The camera 100 has, on its top surface, a shutter button 101, a power switch 102, a mode changing switch 103, a main electronic dial 104, a sub electronic dial 105, a moving image button 106, and a viewfinder external display unit 107. The shutter button 101 is an operation unit for performing shooting preparations or making a shooting instruction. The power switch 102 is an operation unit for switching the power of the camera 100 on and off. The mode changing switch 103 is an operation unit for switching among various types of modes. The main electronic dial 104 is a rotary operation unit for changing setting values such as shutter speed, aperture, and the like. The sub electronic dial 105 is a rotary operation unit for moving a selection frame (a cursor), moving through images, and the like. The moving image button 106 is an operation unit for instructing moving image shooting (recording) to start and stop. The viewfinder external display unit 107 displays various setting values such as shutter speed, aperture, and the like.

The camera 100 also has, on its rear surface, a display unit 108, a touch panel 109, a directional key 110, a SET button 111, an AE lock button 112, an enlarge button 113, a playback button 114, and a menu button 115. The camera 100 further includes an eyepiece part 116, an eyepiece viewfinder 117 (a look-through type viewfinder), an eye proximity sensing unit 118, and a touch bar 119. The display unit 108 displays images, various types of information, and the like. The touch panel 109 is an operation unit that detects touch operations made on a display surface (a touch operation surface) of the display unit 108. The directional key 110 is an operation unit constituted by a key which can be depressed in the up, down, left, and right directions (a four-direction key). Operations can be made according to the position of the directional key 110 which has been depressed. The SET button 111 is an operation unit pressed mainly when confirming a selected item. The AE lock button 112 is an operation unit pressed when locking the exposure state in a shooting standby state. The enlarge button 113 is an operation unit for switching an enlarged mode on and off during live view display (LV display) in a shooting mode. Operating the main electronic dial 104 while the enlarged mode is on enlarges or reduces the live view image (LV image). Additionally, the enlarge button 113 is used to enlarged playback images in a playback mode, increase an enlargement rate, and so on. The playback button 114 is an operation unit for switching between a shooting mode and a playback mode. Pressing the playback button 114 during the shooting mode causes a transition to the playback mode, and the newest image among images recorded in a recording medium 227 (described later) can be displayed in the display unit 108.

The menu button 115 is an operation unit pressed when displaying a menu screen, in which various types of settings can be made, in the display unit 108. A user can make various types of settings intuitively by using the menu screen displayed in the display unit 108, the directional key 110, the SET button 111, and the like. The eyepiece part 116 is a part to which the eye is brought near to view the eyepiece viewfinder 117. The user can view an image displayed in an internal electronic viewfinder (EVF) 217 (described later) through the eyepiece part 116. The eye proximity sensing unit 118 is a sensor that senses whether or not the user's eye is near the eyepiece part 116.

The touch bar 119 is a bar-shaped touch-based operation unit (line touch sensor) capable of accepting touch operations. The touch bar 119 is disposed in a position where the user can make a touch operation (can touch) with their right thumb while holding a grip part 120 with their right hand (with the pinky, ring, and middle fingers of their right hand) in a state where the shutter button 101 can be depressed by the index finger of their right hand. In other words, the touch bar 119 can be operated in a state where the shutter button 101 can be depressed at any time (a shooting attitude) while looking into the eyepiece viewfinder 117 with the eye close to the eyepiece part 116. The touch bar 119 can accept a tap operation on the touch bar 119 (an operation of touching and releasing within a predetermined amount of time without moving), left and right slide operations (operations of touching and then moving the touched position while remaining in contact), and the like. The touch bar 119 is a different operation unit from the touch panel 109 and may have a display function. The touch bar 119 according to the present embodiment is a multi-function bar, and functions as a M-Fn bar, for example.

The camera 100 also includes the grip part 120, a thumbrest part 121, a terminal cover 122, a lid 123, and a communication terminal 124. The grip part 120 is a holding part formed in a shape which is easy for the user to grip with their right hand while holding the camera 100. The shutter button 101 and the main electronic dial 104 are disposed in positions which can be operated by the right index finger while the camera 100 is held by gripping the grip part 120 with the right pinky, ring, and middle fingers. The sub electronic dial 105 and the touch bar 119 are disposed in positions which can be operated by the right thumb in the same state. The thumbrest part 121 (thumb standby position) is a grip part provided on the rear of the camera 100 at a location where it is easy to place the thumb of the right hand which is holding the grip part 120 while not operating any operation units. The thumbrest part 121 is constituted by a rubber member or the like to increase the holding power (the grip). The terminal cover 122 protects connectors such as connection cables that connect the camera 100 to external devices. The lid 123 protects the recording medium 227 (described later) and a slot for storing the recording medium 227 by covering the slot. The communication terminal 124 is a terminal for communication with a lens unit 200 (described later) which can be attached to and removed from the camera 100.

Figure 3:
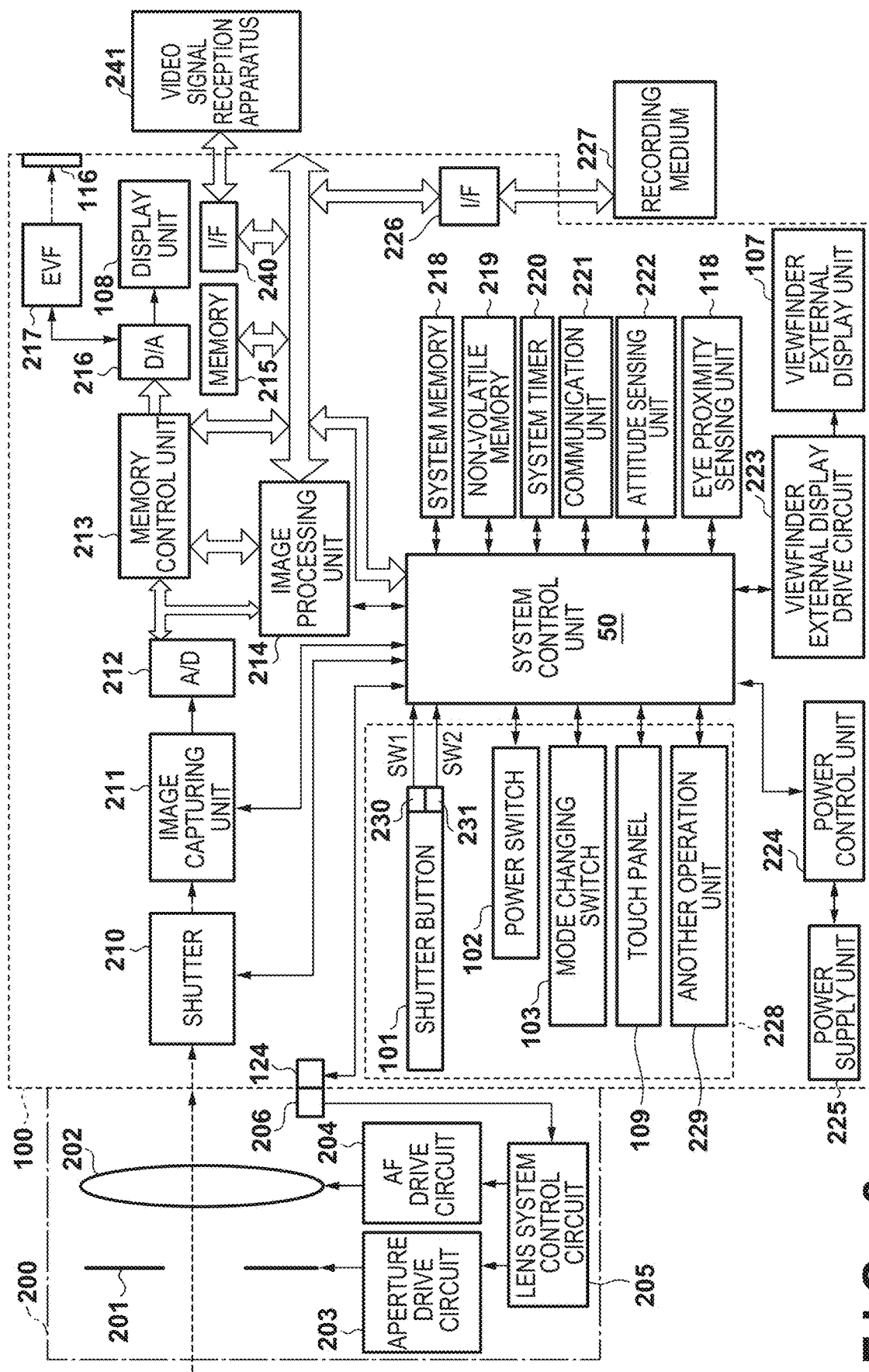
FIG. 3 is a diagram illustrating an example of the internal configuration of the camera 100.

FIG. 3 is a diagram illustrating an example of the internal configuration of the camera 100. Note that elements that are the same in FIGS. 2A and 2B will be given the same reference signs, and will not be described, as appropriate. The lens unit 200 can be mounted on the camera 100.

The lens unit 200 will be described first. The lens unit 200 is a type of interchangeable lens that can be attached to and removed from the camera 100. The lens unit 200 is a monocular lens and is an example of a normal lens.

The lens unit 200 includes an aperture stop 201, a lens 202, an aperture drive circuit 203, an AF drive circuit 204 (an autofocus drive circuit), a lens system control circuit 205, and a communication terminal 206. The aperture stop 201 is configured such that the diameter of the opening can be adjusted. The lens 202 is constituted by a plurality of lenses. The aperture drive circuit 203 adjusts an amount of light by controlling the diameter of the opening in the aperture stop 201. The AF drive circuit 204 drives the lens 202 to adjust the focus. The lens system control circuit 205 controls the aperture drive circuit 203, the AF drive circuit 204, and the like based on the instructions from a system control unit 50 (described later). The lens system control circuit 205 controls the aperture stop 201 through the aperture drive circuit 203 and focuses the lens 202 by causing the position thereof to displace through the AF drive circuit 204. The lens system control circuit 205 can communicate with the camera 100. Specifically, communication is performed through the communication terminal 206 of the lens unit 200 and the communication terminal 124 of the camera 100. The communication terminal 206 is a terminal for the lens unit 200 to communicate with the camera 100 side.

The configuration of the camera 100 will be described next. The camera 100 includes a shutter 210, an image capturing unit 211, an A/D converter 212, a memory control unit 213, an image processing unit 214, memory 215, a D/A converter 216, the EVF 217, the display unit 108, and the system control unit 50. The shutter 210 is a focal plane shutter through which the exposure time of the image capturing unit 211 can be freely controlled based on instructions from the system control unit 50. The image capturing unit 211 is an image sensor constituted by a CCD, a CMOS element, or the like that converts an optical image into an electrical signal. The image capturing unit 211 may have an image capturing plane phase difference sensor that outputs defocus amount information to the system control unit 50. The A/D converter 212 converts analog signals output from the image capturing unit 211 into digital signals. The image processing unit 214 carries out predetermined processing (pixel interpolation, resizing processing such as reduction, color conversion processing, and the like) on data from the A/D converter 212 or data from the memory control unit 213. Additionally, the image processing unit 214 performs predetermined computational processing using shot image data, and the system control unit 50 performs exposure control, rangefinding control, and the like based on results obtained from these computations. Through this processing, through-the-lens (TTL) AF processing, automatic exposure (AE) processing, flash pre-emission (EF) processing, and the like are implemented. Furthermore, the image processing unit 214 performs predetermined computational processing using the shot image data, performing TTL auto white balance (AWB) processing based on the obtained computational results.

Image data from the A/D converter 212 is written into the memory 215 through the image processing unit 214 and the memory control unit 213. Alternatively, image data from the A/D converter 212 is written into the memory 215 through the memory control unit 213 without going through the image processing unit 214. The memory 215 stores the image data obtained by the image capturing unit 211 and converted into digital data by the A/D converter 212, image data for display in a display unit 108 and the EVF 217, and the like. The memory 215 is provided with a storage capacity sufficient to store a predetermined number of still images, a predetermined time's worth of moving images and audio, and the like. The memory 215 also functions as image display memory (video memory).

The D/A converter 216 converts data for image display, stored in the memory 215, into an analog signal and supplies the analog signal to the display unit 108 and the EVF 217. The image data for display written into the memory 215 is therefore displayed by the display unit 108, the EVF 217, or the like via the D/A converter 216. The display unit 108 and the EVF 217 perform displays according to the analog signal from the D/A converter 216. The display unit 108 and the EVF 217 are, for example, LCD, organic EL, or similar displays. The digital signals A/D-converted by the A/D converter 212 and stored in the memory 215 are converted to analog signals by the D/A converter 216, and successively transferred to and displayed by the display unit 108, the EVF 217, or the like, thereby realizing the live view display.

The system control unit 50 is a control unit constituted by at least one processor and/or at least one circuit. In other words, the system control unit 50 may be a processor, a circuit, or a combination of a processor and a circuit. The system control unit 50 controls the camera 100 as a whole. The system control unit 50 implements each process of the flowcharts described later by executing programs recorded in non-volatile memory 219. The system control unit 50 also performs display control by controlling the memory 215, the D/A converter 216, the display unit 108, the EVF 217, and the like.

The camera 100 also includes system memory 218, the non-volatile memory 219, a system timer 220, a communication unit 221, an attitude sensing unit 222, and the eye proximity sensing unit 118. The system memory 218 is, for example, RAM. Operational constants and variables of the system control unit 50, programs read out from the non-volatile memory 219, and so on are loaded into the system memory 218. The non-volatile memory 219 is memory that can be recorded to and erased electrically, and is constituted by, for example, EEPROM. Operational constants, programs, and the like of the system control unit 50 are recorded in the non-volatile memory 219. Here, the "programs" are programs for executing the flowcharts described later. The system timer 220 is a time measurement unit that measures times used in various types of control, measures the time of an internal clock, and so on. The communication unit 221 sends and receives video signals, audio signals, and the like to and from external devices connected wirelessly or over a hardwire cable. The communication unit 221 can also connect to a wireless local area network (LAN), the Internet, and the like. The communication unit 221 is also capable of communicating with external devices over Bluetooth (registered trademark), Bluetooth Low Energy, or the like. The communication unit 221 can transmit images shot by the image capturing unit 211 (including live images), images recorded in the recording medium 227, and the like, and can also receive image data and various other types of information from external devices. The attitude sensing unit 222 senses the attitude of the camera 100 relative to the direction of gravity. Whether an image shot by the image capturing unit 211 is an image shot while the camera 100 was held horizontally or vertically can be determined on the basis of the attitude sensed by the attitude sensing unit 222. The system control unit 50 can add orientation information based on the attitude sensed by the attitude sensing unit 222 to the image file of an image shot by the image capturing unit 211, record the image in a rotated state, and so on. An accelerometer, a gyrosensor, or the like can be used as the attitude sensing unit 222, for example. The attitude sensing unit 222 can also be used to sense movement of the camera 100 (pan, tilt, lifting, whether the camera is at rest, and the like).

The eye proximity sensing unit 118 can sense the approach of an object to the eyepiece part 116 of the eyepiece viewfinder 117 that incorporates the EVF 217. For example, an infrared proximity sensor can be used for the eye proximity sensing unit 118. When an object is nearby, infrared light emitted from a light-emitting unit of the eye proximity sensing unit 118 are reflected by the object and received by a light-receiving unit of the infrared proximity sensor. The distance from the eyepiece part 116 to the object can be determined by the amount of infrared light received. In this manner, the eye proximity sensing unit 118 carries out eye proximity sensing, in which the distance of an object to the eyepiece part 116 is sensed. The eye proximity sensing unit 118 is an eye proximity sensor that detects the approach (eye proximity) and separation (eye separation) of an eye (the object) to the eyepiece part 116 of the eyepiece viewfinder 117. When, in an eye non-proximate state (a non-proximate state), an object has been sensed within a predetermined distance from the eyepiece part 116, it is determined that eye proximity has been sensed. On the other hand, when, in an eye-proximate state (a proximate state), the object that had been detected as being in the proximity moves away by greater than or equal to a predetermined distance, it is determined that eye separation has been sensed. A threshold for sensing eye proximity and a threshold for sensing eye separation may differ by, for example, applying hysteresis. Additionally, after eye proximity has been sensed, the eye-proximate state is considered to be in effect until eye separation is sensed. After eye separation has been sensed, the eye non-proximate state is considered to be in effect until eye proximity is sensed. The system control unit 50 switches the display unit 108 and the EVF 217 between displaying (a display state)/not displaying (a non-display state) in accordance with the state sensed by the eye proximity sensing unit 118. Specifically, when the camera is at least in the shooting standby state and a display destination switch setting is set to auto switching, the display destination is set to the display unit 108 for display, and the EVF 217 is set not to display, while an eye is not in proximity. When an eye is in proximity, the display destination is set to the EVF 217, which is turned on, and the display unit 108 is set not to display. Note that the eye proximity sensing unit 118 is not limited to an infrared proximity sensor, and other sensors may be used as long as the sensors can sense a state that can be considered eye proximity. The camera 100 also includes the viewfinder external display unit 107, a viewfinder external display drive circuit 223, a power control unit 224, a power supply unit 225, a recording medium I/F 226, an operation unit 228, and a video signal output I/F 240. The viewfinder external display unit 107 displays various setting values of the camera 100, such as shutter speed, aperture, and the like, through the viewfinder external display drive circuit 223. The power control unit 224 is constituted by a battery detection circuit, a DC-DC converter, switch circuits for switching the blocks through which power passes, and so on, and detects whether or not a battery is connected, the type of the battery, the remaining battery power, and so on. The power control unit 224 also controls the DC-DC converter based on the detection results and instructions from the system control unit 50, and supplies a necessary voltage for a necessary period to the various units, including the recording medium 227. The power supply unit 225 is a primary battery such as an alkali battery, a lithium battery, or the like, a secondary battery such as a NiCd battery, a NiMH battery, a Li battery, or the like, an AC adapter, or the like. The recording medium I/F 226 is an interface for the recording medium 227 such as a memory card, a hard disk, or the like. The recording medium 227 is a memory card or the like for recording shot images, and is constituted by semiconductor memory, a magnetic disk, or the like. The recording medium 227 may be removable or built-in. The video signal output I/F 240 is an interface (HDMI terminal) for performing High-Definition Multimedia Interface (HMDI) output. Video signals from the camera 100 are output, via an HDMI cable, to a video signal reception apparatus 241 such as an external display or an external recorder.

The operation unit 228 is an input unit that accepts operations from the user (user operations), and is used to input various types of instructions to the system control unit 50. The operation unit 228 includes the shutter button 101, the power switch 102, the mode changing switch 103, the touch panel 109, and another operation unit 229. The other operation unit 229 includes, the main electronic dial 104, the sub electronic dial 105, the moving image button 106, the directional key 110, the SET button 111, the AE lock button 112, the enlarge button 113, the playback button 114, the menu button 115, and the touch bar 119.

The shutter button 101 has a first shutter switch 230 and a second shutter switch 231. The first shutter switch 230 turns on when the shutter button 101 is manipulated halfway, or in other words, is half-pressed (a shooting preparation instruction), and generates a first shutter switch signal SW1. The system control unit 50 starts shooting preparation processing, such as AF processing, AE processing, AWB processing, and EF processing, in response to the first shutter switch signal SW1. The second shutter switch 231 turns on when the shutter button 101 is completely manipulated, or in other words, is fully pressed (a shooting instruction), and generates a second shutter switch signal SW2. In response to the second shutter switch signal SW2, the system control unit 50 starts a series of shooting processing, from reading out signals from the image capturing unit 211 to generating an image file containing the captured image and writing the file into the recording medium 227.

The mode changing switch 103 switches the operating mode of the system control unit 50 among a still image shooting mode, a moving image shooting mode, a playback mode, and the like. The still image shooting mode includes an auto shooting mode, an auto scene determination mode, a manual mode, an aperture priority mode (Av mode), a shutter speed priority mode (Tv mode), and a program AE mode (P mode). There are also various types of scene modes, custom modes, and the like as shooting settings for different shooting scenes. The user can directly switch to any of the shooting modes mentioned above using the mode changing switch 103. Alternatively, the user can selectively switch to any of a plurality of modes displayed by using the operation unit 228 after first switching to a shooting mode list screen using the mode changing switch 103. Likewise, the moving image shooting mode may include a plurality of modes.

The touch panel 109 is a touch sensor that detects various types of touch operations on the display surface of the display unit 108 (an operation surface of the touch panel 109). The touch panel 109 and the display unit 108 can be configured as an integrated unit. For example, the touch panel 109 has a light transmittance that does not interfere with the display of the display unit 108, and is attached to the upper layer of the display surface of the display unit 108. By associating input coordinates on the touch panel 109 with the display coordinates on the display surface of the display unit 108, a graphical user interface (GUI) can be configured to make it seem that the user can directly manipulate screens displayed in the display unit 108. The touch panel 109 can use any of a variety of systems, including resistive film, electrostatic capacitance, surface acoustic wave, infrared, electromagnetic induction, image recognition, optical sensors, and the like. Depending on the type, a touch is sensed when contact is made with the touch panel 109, or a touch is sensed when a finger or pen has approached the touch panel 109, and either of these types may be used.

The system control unit 50 can detect the following operations or states on the touch panel 109.

- A finger or pen that has not touched the touch panel 109 newly touching the touch panel 109, i.e., the start of a touch (called "touch-down" hereinafter).
- A state in which a finger or pen is touching the touch panel 109 (called "touch-on" hereinafter).
- A finger or pen moving while touching the touch panel 109 (called "touch-move" hereinafter).
- A finger or pen that has been touching the touch panel 109 separating from the touch panel 109 (being released), i.e., the end of a touch (called "touch-up" hereinafter).
- When nothing is touching the touch panel 109 (called "touch-off" hereinafter).

When a touch-down is detected, a touch-on is detected at the same time. A touch-on normally continues to be detected after a touch-down as long as no touch-up is detected. When a touch-move is detected, a touch-on is detected at the same time as well. Even if a touch-on is detected, a touch-move is not detected as long as the touched position does not move. A touch-off occurs after a touch-up has been detected for all fingers or pens that had been touching.

These operations/states, positional coordinates on the touch panel 109 where the finger or pen had been touching, and so on are communicated to the system control unit 50 through an internal bus. The system control unit 50 determines what type of operation (touch operation) has been made on the touch panel 109 based on the communicated information. With respect to a touch-move, the movement direction of the finger or pen moving on the touch panel 109 can be determined based on changes in the positional coordinates, for each of a vertical component and a horizontal component on the touch panel 109. A slide operation is determined to have been performed if a touch-move of greater than or equal to a predetermined distance has been detected. If, while touching the touch panel 109, the finger is quickly moved a given distance and then removed, the operation is called "flicking". In other words, a "flick" is an operation of quickly flicking a finger on the touch panel 109. A flick is determined to have been performed if a touch-move of greater than or equal to a predetermined distance and at greater than or equal to a predetermined speed is detected and a touch-up is then detected (it can be determined that a flick occurred continuing from a slide operation). Furthermore, when a plurality of locations (two points, for example) are touched at the same time (are multi-touched), and the touched positions are brought together, the touch operation is called a "pinch-in", whereas when the touched positions are moved apart, the touch operation is called a "pinch-out". Pinch-out and pinch-in are collectively referred to as pinch operations (or simply "pinching").

Configuration of VR180 Lens 300

Figure 4:
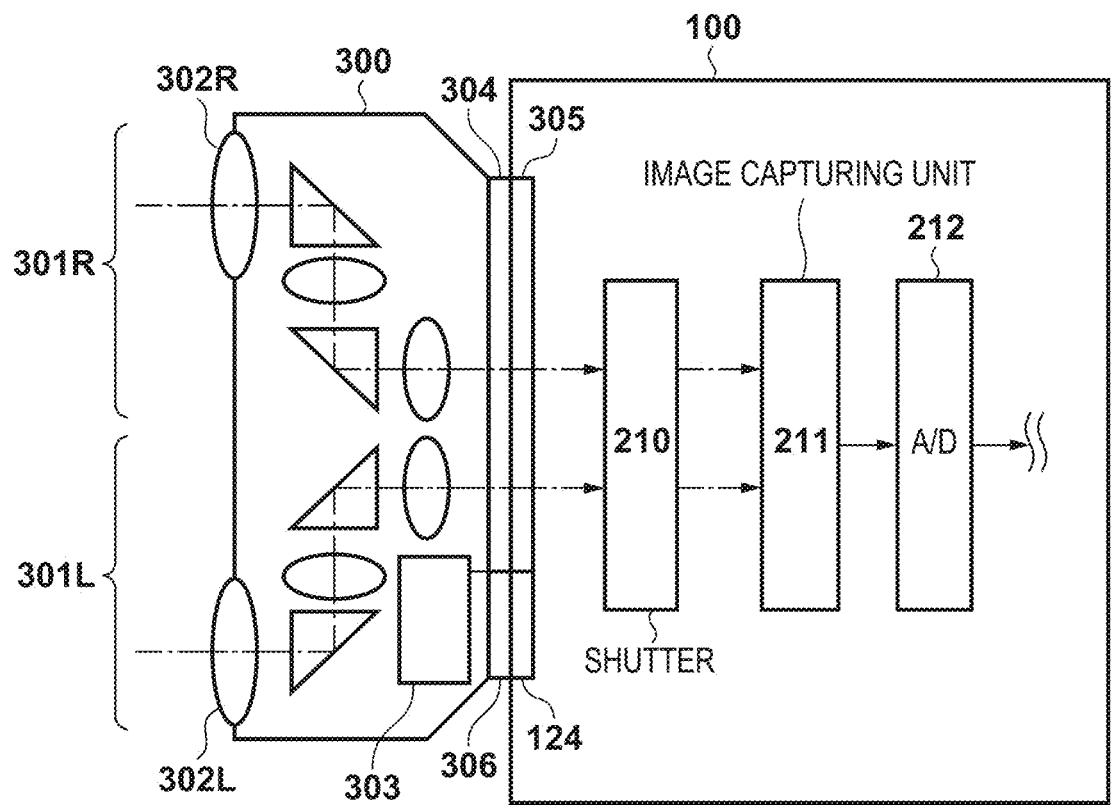
FIG. 4 is a diagram illustrating an example of the configuration of a VR180 lens 300 which can be mounted to the camera 100.

FIG. 4 is a diagram illustrating an example of the configuration of the VR180 lens 300 which can be mounted to the camera 100. FIG. 4 illustrates the VR180 lens 300 mounted to the camera 100. In the camera 100 illustrated in FIG. 4, the elements configurations as those illustrated in FIG. 3 are given the same reference signs, and will not be described, as appropriate.

The VR180 lens 300 is a type of interchangeable lens that can be attached to and removed from the camera 100. The VR180 lens 300 is a binocular lens that enables shooting with parallax between a left image and a right image. The VR180 lens 300 has two optical systems, each having a substantially 180-degree wide viewing angle and capable of shooting a forward hemispheric range. Specifically, the two optical systems of the VR180 lens 300 can shoot a subject at a visual field (angle of view) of 180 degrees in a left-right direction (horizontal angle, azimuth angle, yaw angle) and 180 degrees in the up-down direction (vertical angle, elevation angle, pitch angle), respectively.

The VR180 lens 300 has a right eye optical system 301R having a plurality of lenses, reflective mirrors, and the like, a left eye optical system 301L having a plurality of lenses, reflective mirrors, and the like, and a lens system control circuit 303. The right eye optical system 301R corresponds to an example of a first optical system, and the left eye optical system 301L corresponds to an example of a second optical system. In the right eye optical system 301R and the left eye optical system 301L, respective lenses 302R and 302L located on the subject side face in the same direction, and the optical axes thereof are substantially parallel.

The VR180 lens 300 according to the present embodiment is a lens for capturing images for what is known as "VR 180", a format of VR images that enables binocular stereoscopic viewing and has a 180-degree visual field. The VR180 lens 300 includes a fisheye lens that enables each of the right eye optical system 301R and the left eye optical system 301L to capture a substantially 180-degree range. Note that the VR180 lens 300 may be any lens that enables the right eye optical system 301R and the left eye optical system 301L to each obtain images that can be displayed in binocular VR as VR180, and may be a lens capable of capturing a wide viewing angle range of about 160 degrees, which is narrower than the 180 degree range. The VR180 lens 300 can form a right image (a first image) formed through the right eye optical system 301R and a left image (a second image) formed through the left eye optical system 301L, which has parallax with respect to the right image, on one or two image sensors of the mounted camera.

The VR180 lens 300 is mounted to the camera 100 using a lens mount part 304 and a camera mount part 305 of the camera 100. By mounting the VR180 lens 300 to the camera 100, the system control unit 50 of the camera 100 and the lens system control circuit 303 of the VR180 lens 300 are electrically connected by the communication terminal 124 of the camera 100 and a communication terminal 306 of the VR180 lens 300.

In the present embodiment, the right image formed through the right eye optical system 301R and the left image formed through the left eye optical system 301L, which has parallax with respect to the right image, are formed as side-by-side images on the image capturing unit 211 of the camera 100. In other words, two optical images formed by the right eye optical system 301R and the left eye optical system 301L are formed on a single image sensor. The image capturing unit 211 converts the formed subject image (an optical signal) into an analog electrical signal. In this manner, by using the VR180 lens 300, two images having parallax can be obtained simultaneously (as a set) from two locations (optical systems), namely the right eye optical system 301R and the left eye optical system 301L. Additionally, by displaying the obtained images in VR separately as a left eye image and a right eye image, the user can view a three-dimensional VR image over a substantially 180-degree range, which is what is known as "VR180".

Here, a "VR image" is an image that can be displayed in VR (described later). VR images include omnidirectional images (fulldome spherical images) shot by an omnidirectional camera (fulldome spherical camera), panoramic images that have a wider image range (effective image range) than the display range which can be displayed by a display unit at one time, and the like. VR images are also not limited to still images, and also include moving images and live images (images obtained from a camera almost in real time). A VR image has an image range (effective image range) equivalent to a visual field of up to 360 degrees in the left-right direction and 360 degrees in the up-down direction. VR images also include images that have a wider angle of view than can be shot a normal camera or a wider image range than can be displayed by a display unit at one time, even if the angle is less than 360 degrees in the left-right direction or 360 degrees in the up-down direction. The image shot by the camera 100 using the VR180 lens 300 described above is a type of VR image. VR images can be displayed in VR, for example, by setting the display mode of a display device (a display device capable of displaying VR images) to "VR view". By displaying VR images with a 360-degree angle of view in VR, the user can view omnidirectional images which are seamless in the left-right direction by changing the attitude of the display device in the left-right direction (a horizontal rotation direction).

Here, VR display (VR view) is a display method (a display mode) that can change the display range of a VR image in which an image is displayed in a visual field range based on the attitude of the display device. VR display includes "monocular VR display (monocular VR view)," in which a single image is displayed by applying a deformation that maps the VR image onto a virtual sphere (deformation in which distortion correction is applied). VR display also includes "binocular VR display (binocular VR view)," in which a left eye VR image and a right eye VR image are displayed side by side in left and right regions by performing a transformation that maps those images onto a virtual sphere, respectively. It is possible to view stereoscopic images by performing a "binocular VR display" using the left eye VR image and the right eye VR image, which have parallax with respect to each other. In any VR display, for example, when a user wears a display device such as a head-mounted display (HMD), the image is displayed in a visual field range corresponding to the direction in which the user's face is facing. For example, assume that at a given point in time, a VR image displays a visual field range centered at 0 degrees in the left-right direction (a specific heading, e.g., north) and 90 degrees in the up-down direction (90 degrees from the zenith, i.e., horizontal). If the attitude of the display device is flipped front-to-back from this state (e.g., the display plane is changed from facing south to facing north), the display range is changed to an image of a visual field range centered at 180 degrees in the left-right direction (the opposite heading, e.g., south) and 90 degrees in the up-down direction, of the same VR image. In other words, when the user turns their face from north to south (i.e., turns around) while wearing the HMD, the image displayed in the HMD is also changed from an image of the north to an image of the south.

Note that the VR image shot using the VR180 lens 300 of the present embodiment is a VR180 image of a range of substantially 180 degrees in the front, and there is no image of a range of substantially 180 degrees in the rear. If such a VR180 image is displayed in VR and the attitude of the display device is changed to a side where the image is not present, a blank region is displayed.

By VR displaying VR images in this way, the user has a visual sense of actually being in the VR image (in a VR space). Note that the VR image display method is not limited to a method of changing the attitude of the display device. For example, the display range may be moved (scrolled) in response to a user operation made using the touch panel, a directional button, or the like. In addition to changing the display range by changing the attitude, the display range may be changed in response to a touch-move made on the touch panel, dragging operations using a mouse or the like, pressing a direction button, or the like during VR display (in the "VR view" display mode). Note that a smartphone attached to VR goggles (a head-mounted adapter) is a type of HMD.

Configuration of PC 500

Figure 5:
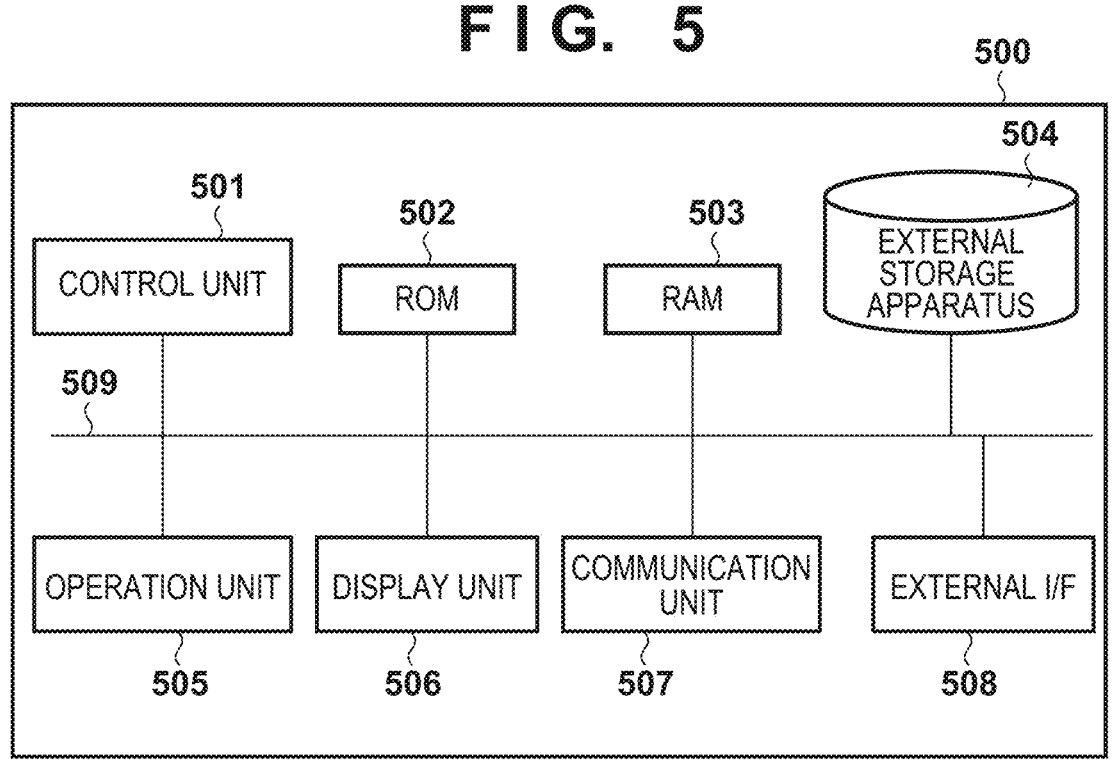
FIG. 5 is a block diagram illustrating the configuration of a PC 500.

FIG. 5 is a block diagram illustrating the configuration of the PC 500. In FIG. 5, 501 indicates a control unit that controls the entire PC 500, and is, for example, a Central Processing Unit (CPU). 502 indicates read-only memory (ROM) that stores programs, parameters, and the like that do not require alterations. An information processing program is stored in the ROM 502 as program code that can be read by the control unit 501, and the control unit 501 executes this information processing program code. 503 indicates random access memory (RAM) that temporarily stores programs, data, and the like supplied from an external apparatus or the like.

504 is an external storage apparatus, including a hard disk, flash memory, or the like, fixedly installed in the PC 500. Alternatively, the external storage apparatus 504 may be an external storage apparatus that includes a floppy disk (FD), an optical disk such as a Compact Disk (CD), a magnetic or optical card, an IC card, a memory card, or the like that can be removed from the PC 500. Image files obtained by PC 500 from the camera 100 are stored in the external storage apparatus 504.

505 indicates an operation unit such as buttons or a touch panel that receives user operations and inputs data. 506 indicates a display unit for displaying data held by the PC 500 or data which has been supplied. 507 indicates a communication unit for communicating with external apparatuses such as the camera 100. 508 indicates an external I/F for sending and receiving video signals or files with the external apparatuses. 509 indicates a system bus that communicatively connects the components of the PC 500.

Features of Images Shot Using VR180 Lens 300

When there is a single lens optical system, an image rotated 180 degrees is formed on the image sensor. When generating a normal image from a 180-degree rotated image, the camera 100 aligns the up-down direction of the image with the up-down direction of the subject by performing a 180-degree rotation process. When an image is shot by the camera 100 with the VR180 lens 300 mounted, the image of each optical system is formed on a single image sensor through the right eye optical system 301R and the left eye optical system 301L. At this time, the image of each optical system is rotated 180 degrees for each optical system. As in the case of a single lens optical system, the camera 100 aligns the up-down direction of the image with the up-down direction of the subject by rotating the entire image 180 degrees. While rotation during image formation occurs in units of optical systems, rotation during image generation is performed for the image as a whole, and as such, the image corresponding to the left eye optical system moves to the right side of the overall image, and the image corresponding to the right eye optical system moves to the left side of the overall image. Therefore, in order to display the left and right images in the correct positional relationship, it is necessary to perform the processing of replacing the image on the left side with the image on the right side.

Shooting Processing by Camera 100

Shooting processing performed by the camera 100 will be described next with reference to FIGS. 6A and 6B. The processing in the flowcharts in FIGS. 6A and 6B starts when the user turns the camera 100 on.

In step S601, the system control unit 50 determines whether the firmware of the camera 100 is compatible with a VR180 lens. If the firmware is determined to be compatible with a VR180 lens, the sequence moves to step S602. If the firmware is determined not to be compatible with a VR180 lens, the sequence moves to step S622. Because the optical system of a VR180 lens is different from a typical lens, it is necessary for the camera 100 to be able to read and record VR180 lens metadata for post-processing. Accordingly, the system control unit 50 determines whether the firmware is compatible with a VR180 lens.

In step S602, the system control unit 50 determines whether a VR180 lens (e.g., the VR180 lens 300 illustrated in FIG. 4) is mounted to the camera 100. If it is determined that a VR180 lens is mounted, the sequence moves to step S603. If it is determined that a VR180 lens is not mounted, the sequence moves to step S622.

In step S603, the system control unit 50 obtains design values of the VR180 lens. The lens design values are used in left-right swapping processing and equirectangular projection processing (described later).

In step S604, the system control unit 50 obtains individual values of the VR180 lens. In addition to the lens design values, the VR180 lens holds additional information on individual values, such as manufacturing error and the like. In the equirectangular projection processing, manufacturing error values are used to obtain better results than equirectangular projection using only the design values.

In step S605, the system control unit 50 obtains an image from the image capturing unit 211.

In step S606, the system control unit 50 displays the image obtained in step S605 in the EVF 217 (a live view display).

In step S607, the system control unit 50 determines whether a recording start instruction has been made by the shutter button 101 being operated. If it is determined that a recording start instruction has been made, the sequence moves to step S608. If it is determined that a recording start instruction has not been made, the sequence moves to step S605. Accordingly, the live view display in the EVF is repeated until the user makes a recording start instruction. The recording start instruction may be an instruction to shoot a still image or an instruction to shoot a moving image.

In step S608, the system control unit 50 obtains an image from the image capturing unit 211.

In step S609, the system control unit 50 obtains shooting information, such as the shutter speed at the time of shooting, and metadata, such as attitude information of the camera 100 at the time of shooting. The attitude information is obtained from the attitude sensing unit 222. The system control unit 50 also obtains metadata and the like necessary for development of an image in RAW format (RAW image).

In step S610, the system control unit 50 records the image obtained in step S608 in a file as an image in RAW format (RAW image).

In step S611, the system control unit 50 records the shooting information and metadata obtained in step S609 in association with the file. For example, the system control unit 50 records the shooting information and metadata in the same file as the image.

In step S612, the system control unit 50 records information of the VR180 lens, obtained in steps S603 and S604, in association with the file. For example, the system control unit 50 records the information of the VR180 lens in the same file as the image.

In step S613, the system control unit 50 determines whether the user has made a recording end instruction. When shooting a still image, a single image is shot, and it is therefore assumed that the recording start instruction and the recording end instruction are given at the same time. When shooting a moving image, the user presses the shutter button 101 again to make the recording end instruction. If it is determined that a recording end instruction has been made, the processing of this flowchart ends. If it is determined that a recording end instruction has not been made, the sequence moves to step S608. The system control unit 50 repeats the processing from steps S608 to S613 to record moving images into files one after another.

Next, the case where the sequence moves from step S601 or step S602 to step S622 will be described. Note that if the sequence has moved from step S601 to step S622, the firmware of the camera 100 is not compliant with a VR180 lens. Accordingly, the camera 100 cannot perform processing specific to the VR180 lens. As such, even if a VR180 lens is mounted to the camera 100, the camera 100 performs the same processing as when a normal lens is mounted.

In step S622, the system control unit 50 determines whether a lens is mounted to the camera 100. If it is determined that a lens is mounted, the sequence moves to step S623. If it is determined that no lens is mounted, the processing of this flowchart ends.

In step S623, the system control unit 50 obtains general information about the lens (e.g., a lens name).

In step S624, the system control unit 50 determines whether the general information about the lens has been obtained in step S623. If the general information about the lens has been successfully obtained, the sequence moves to step S625. If the general information about the lens could not be obtained, the sequence moves to step S626. For example, if the camera 100 and the lens have different manufacturers and the camera 100 cannot communicate with the lens, the camera 100 cannot obtain information from the lens.

In step S625, the system control unit 50 holds the general information on the lens obtained in step S623 in the system memory 218.

The processing of steps S626 to S632 is similar to that of steps S605 to S611, and will therefore not be described.

In step S633, the system control unit 50 determines whether the general information on the lens is held in the system memory 218 (see step S625). If the general information on the lens is held, the sequence moves to step S634. If the general information on the lens is not held, the sequence moves to step S635.

In step S634, the system control unit 50 records the general information on the lens, held in the system memory 218, in association with the file. For example, the system control unit 50 records the general information on the lens in the same file as the image.

The processing of step S635 is similar to that of step S613; that is, if a recording end instruction is made, the processing of this flowchart ends, whereas if a recording end instruction is not made, the sequence moves to step S629. The system control unit 50 repeats the processing from steps S629 to S635 to record moving images into files one after another.

Figure 6A:
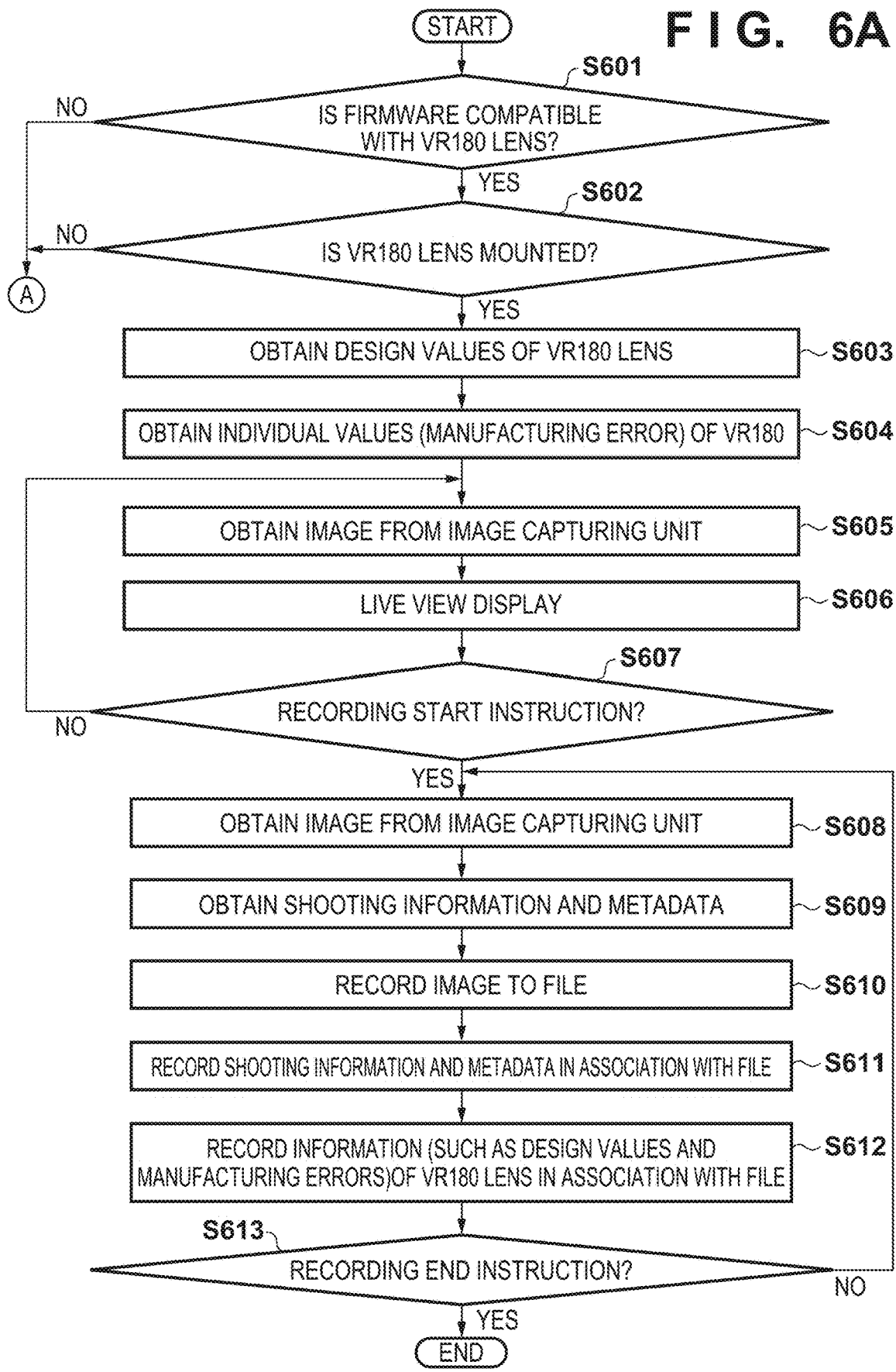
FIG. 6A is a flowchart illustrating shooting processing by the camera 100 according to one or more aspects of the present disclosure.
Figure 6B:
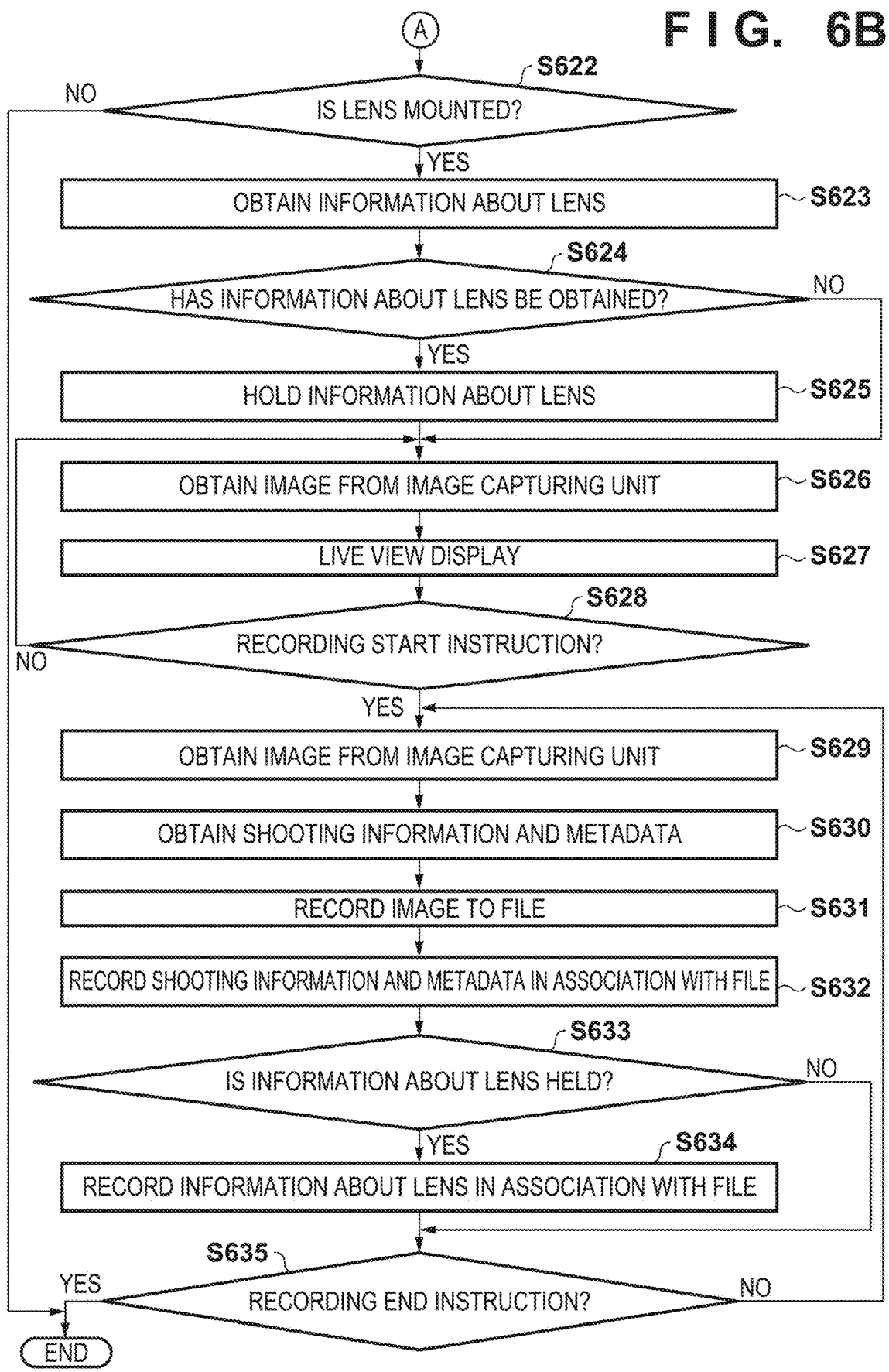
FIG. 6B is a flowchart illustrating shooting processing by the camera 100 according to one or more aspects of the present disclosure.

Note that the RAW image shot in the flowcharts in FIGS. 6A and 6B may be a still image (RAW still image) or a moving image (RAW moving image).

Image Shot by Camera 100 with VR180 Lens 300 Mounted

An example of an image shot and recorded by the camera 100 to which the VR180 lens 300 is mounted will be described next with reference to FIGS. 11A and 11B.

The VR180 lens 300 is designed assuming specific values with respect to the size of the image sensor and the angle of view to be recorded. For example, with a VR180 lens 300 that assumes a DCI 8K angle of view, the assumed angle of view is 8192×4320.

On the other hand, depending on the shooting settings, the camera 100 can also record at angles of view other than the angle of view assumed by the VR180 lens 300. For example, with UHD 8K settings, the angle of view is 7680×4320. In this case, even though the entire image from the VR180 lens 300 is input on the image sensor, a part of the image (e.g., both ends) is not recorded.

FIG. 11A is an example of an image recorded at an angle of view that uses the entire image sensor, using the camera 100 having an image sensor of the size assumed by the VR180 lens 300. This is a case, for example, where the image sensor size assumed by the VR180 lens 300 is DCI 8K (8192×4320) and the recording size is also DCI 8K. In this case, two circular fisheye images aligned on the left and right are fully recorded.

FIG. 11B is an example of an image recorded at an angle of view that uses part of image sensor, using the camera 100 having an image sensor of the size assumed by the VR180 lens. This is a case, for example, where the image sensor size assumed by the VR180 lens is DCI 8K (8192×4320) but the recording size is UHD 8K (7680×4320). In this case, two circular fisheye images aligned on the left and right are fully formed on the image sensor, but are recorded with parts of the images missing. For example, as illustrated in FIG. 11B, the two circular fisheye images aligned on the left and right are recorded in a state where a left side part of the left circular image and a right side part of the right circular image are missing. In the following descriptions, a region (part) of the circular fisheye image which is missing will also be called a "missing region" or a "missing part".

Developing Processing and Equirectangular Projection Processing by PC 500

The developing processing and the equirectangular projection processing performed by the PC 500 will be described with reference to FIGS. 7 and 8. The PC 500 performs the developing processing and the equirectangular projection processing on the RAW image contained in the image file obtained from the camera 100. As a result of the developing processing and the equirectangular projection processing, a pair of left and right equirectangular projection images are generated from a pair of left and right circular fisheye images such as those described with reference to FIGS. 11A and 11B. Note that in the example of FIG. 7, the developing processing is included in the processing of step S712 (equirectangular projection image generation processing).

In step S701, the control unit 501 reads the RAW image from the image file. This is a still image or a moving image of the image file illustrated in FIG. 9 and described later.

In step S702, the control unit 501 reads the shooting information and non-VR180 lens metadata from the image file. This is the shooting information, and the non-VR180 lens metadata, of the image file illustrated in FIG. 9 and described later. The non-VR180 lens metadata contains metadata necessary for development of the RAW image (RAW development).

In step S703, the control unit 501 determines if the image file has VR180 lens metadata. This is the VR180 lens metadata of the image file illustrated in FIG. 9 and described later. If the image file has VR180 lens metadata, the sequence moves to step S704. If the image file does not have VR180 lens metadata, the sequence moves to step S706.

In step S704, control unit 501 reads the VR180 lens metadata from the image file.

In step S705, the control unit 501 obtains center coordinates and radii of the pair of left and right circular images in the recorded image from the design values of the VR180 lens, among the VR180 lens metadata read in step S704. If the VR180 lens metadata has individual VR lens values (manufacturing error), the control unit 501 obtains the center coordinates and radii of the pair of left and right circular images so as to reflect the individual values as well.

If the sequence has moved from step S703 to step S706, the control unit 501 determines if the image file has a lens name. For example, if the camera 100 firmware does not support VR180 lenses, the camera 100 will not record VR180 lens metadata, but may record a lens name in a region for non-VR180 lens metadata. If the image file has a lens name, the sequence moves to step S707. If the image file does not have a lens name, the sequence moves to step S709.

In step S707, the control unit 501 obtains the lens name from the image file.

In step S708, the control unit 501 determines whether the lens name obtained in step S707 indicates a known VR180 lens. If the lens name obtained in step S707 indicates a known VR180 lens, the sequence moves to step S709. If the lens name obtained in step S707 does not indicate a known VR180 lens, the sequence moves to step S710.

In step S709, the control unit 501 determines the center coordinates and radii of the pair of left and right circular images in the recorded image based on the lens name obtained in step S707. To implement this processing, a program of the PC 500 is configured to hold the lens name and the design values for the center coordinates and radii of the pair of left and right circular images in the image shot with that lens. Alternatively, this information may be provided to the program from the exterior.

If the sequence moves from step S706 or step S708 to step S710, the control unit 501 determines whether the image read in step S701 is a pair of left and right circular fisheye images. For example, the control unit 501 generates a black-and-white binary image with respect to luminance values of the pixels in the read image, in which the pixel value of a pixel is black if the value is less than or equal to a threshold (a value near black) and the pixel value of a pixel is white if the value is greater than the threshold. The control unit 501 can then determine whether the image read in step S701 is a pair of left and right circular fisheye images based on whether white regions of the black-and-white binary image are two circles. If the read image is a pair of left and right circular fisheye images, the sequence moves to step S711. If the read image is not a pair of left and right circular fisheye images, the processing in this flowchart ends.

In step S711, the control unit 501 detects the center coordinates and radii of the two circular fisheye images in the image read in step S701. In a circle, it is known that when two arbitrary straight lines are drawn intersecting with two points on the circumference and a vertical line is drawn from the midpoint of each, the intersection of the two vertical lines is the center of the circle. As such, for example, using the black-and-white binary image generated in step S710, the control unit 501 examines pixel values in the horizontal direction at any vertical position with respect to the region that forms a circle, finds an X coordinate X1 of a pixel that has changed from black to white, and an X coordinate X2 of a pixel that has changed from white to black. The control unit 501 also examines pixel values in the vertical direction at any horizontal position, finds a Y coordinate Y1 of a pixel that has changed from black to white, and a Y coordinate Y2 of a pixel that has changed from white to black. In this case, the center coordinates of the circle are (X1+X2)/2 for the X coordinate and (Y1+Y2)/2 for the Y coordinate. If the pixel value is examined in the horizontal direction from the center coordinates of the circle and the X coordinate of the pixel that changed from white to black is represented by X3, the radius of the circle is X3−((X1+X2)/2).

In step S712, the control unit 501 uses the center coordinates and radii of the two circular fisheye images obtained by the processing in step S705, step S709, or step S711, and generates an equirectangular projection image from the two circular fisheye images. Here, as described with reference to FIG. 11B, the two circular fisheye images may not be recorded in a complete form (that is, parts may be missing) even when the image was shot by the camera 100 with the VR180 lens mounted.

Figure 8:
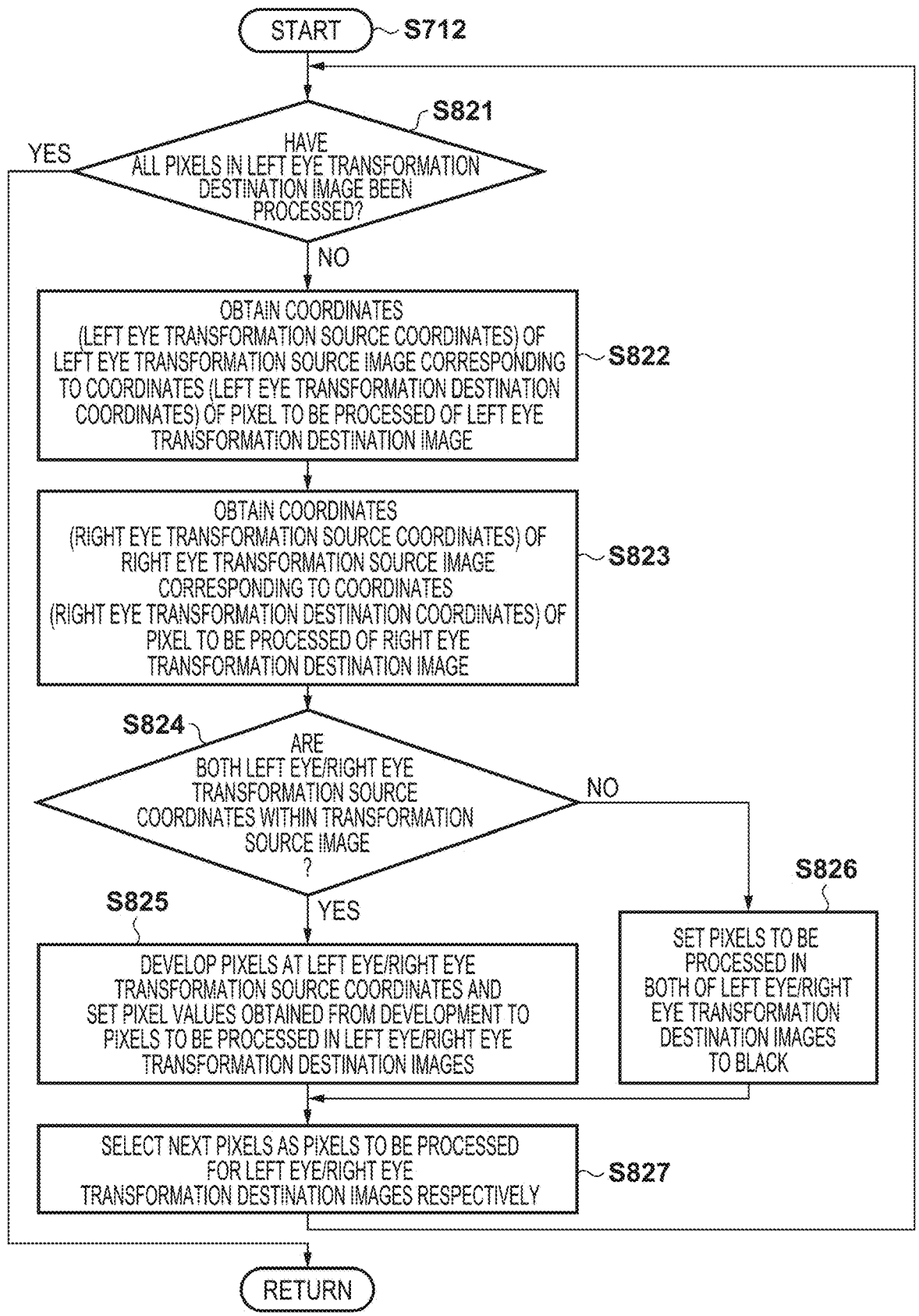
FIG. 8 is a flowchart illustrating, in detail, the processing of steps S712 and S1412 (equirectangular projection image generation processing).

FIG. 8 is a flowchart illustrating, in detail, the processing of step S712 (equirectangular projection image generation processing). In this flowchart, the control unit 501 generates two equirectangular projection images by performing equirectangular projection processing on two circular fisheye images having a missing region. Here, the circular fisheye images are included in RAW images (Bayer data). Accordingly, in this flowchart, the control unit 501 also performs RAW image developing processing (processing for generating RGB data).

In step S821, the control unit 501 determines whether all the pixels in a left eye transformation destination image (the equirectangular projection image corresponding to the left eye) have been processed. In the present embodiment, in one processing loop from step S821 to step S827, in addition to the pixel to be processed in the left eye transformation destination image, a pixel located at the same coordinates as the coordinates of the pixel to be processed in the left eye transformation destination image is processed in a right eye transformation destination image (the equirectangular projection image corresponding to the right eye) as well. Accordingly, if all the pixels in the left eye transformation destination image have been processed, all the pixels in the right eye transformation destination image have been processed as well. Therefore, if all the pixels in the left eye transformation destination image have been processed, the processing in this flowchart ends. If there is an unprocessed pixel in the left eye transformation destination image, the sequence moves to step S822.

In step S822, the control unit 501 obtains (identifies) the coordinates of a left eye transformation source image (the left eye circular fisheye image) (that is, left eye transformation source coordinates) corresponding to the coordinates of the pixel to be processed in the left eye transformation destination image (left eye transformation destination coordinates). Here, the left eye transformation destination coordinates are a coordinate system that takes the upper-left of the left eye transformation destination image as its origin. The processing for obtaining the left eye transformation source coordinates corresponding to the left eye transformation destination coordinates can be performed using a general method of equirectangular projection.

In step S823, the control unit 501 obtains (identifies) the coordinates of a right eye transformation source image (the right eye circular fisheye image) (that is, right eye transformation source coordinates) corresponding to the coordinates of the pixel to be processed in the right eye transformation destination image (right eye transformation destination coordinates). Here, the right eye transformation destination coordinates are a coordinate system that takes the upper-right of the right eye transformation destination image as its origin. The processing for obtaining the right eye transformation source coordinates corresponding to the right eye transformation destination coordinates can be performed using a general method of equirectangular projection.

In step S824, the control unit 501 determines whether the left eye transformation source coordinates are within the left eye transformation source image and the right eye transformation source coordinates are within the right eye transformation source image. If the left eye transformation source coordinates are within the left eye transformation source image and the right eye transformation source coordinates are within the right eye transformation source image, the sequence moves to step S825. If at least one of the left eye transformation source coordinates and the right eye transformation source coordinates are not within the corresponding transformation source image, the sequence moves to step S826.

In step S825, the control unit 501 develops a pixel at the left eye transformation source coordinates of the left eye transformation source image, and sets the pixel value obtained from the development to the pixel to be processed in the left eye transformation destination image. Likewise, the control unit 501 develops a pixel at the right eye transformation source coordinates of the right eye transformation source image, and sets the pixel value obtained from the development to the pixel to be processed in the right eye transformation destination image.

An example of the developing processing performed in step S825 will be described. The control unit 501 obtains the pixel values (in a Bayer state) of a region of N×N pixels (where N is a natural number) with the left eye transformation source coordinates of the left eye transformation source image serving as a center. Then, the control unit 501 obtains the pixel value (an RGB value) at the left eye transformation source coordinates by performing developing processing (interpolation processing) on the pixel at the left eye transformation source coordinates based on the pixel values of the region of N×N pixels and the metadata required for RAW development obtained in step S702 of FIG. 7. Likewise, the control unit 501 obtains the pixel values (in a Bayer state) of a region of N×N pixels (where N is a natural number) with the right eye transformation source coordinates of the right eye transformation source image serving as a center. Then, the control unit 501 obtains the pixel value (an RGB value) at the right eye transformation source coordinates by performing developing processing (interpolation processing) on the pixel at the right eye transformation source coordinates based on the pixel values of the region of N×N pixels and the metadata required for RAW development obtained in step S702 of FIG. 7.

In the developing processing using pixel values from a region of N×N pixels, if a region outside the circular fisheye image region is included in the N×N pixel region, more accurate pixel value calculation is possible by not using the pixels of the region outside the circular fisheye image region in the developing processing.

On the other hand, if the sequence has moved from step S824 to step S826, the control unit 501 sets black in both the pixel to be processed in the left eye transformation destination image and the pixel to be processed in the right eye transformation destination image.

Figure 12:
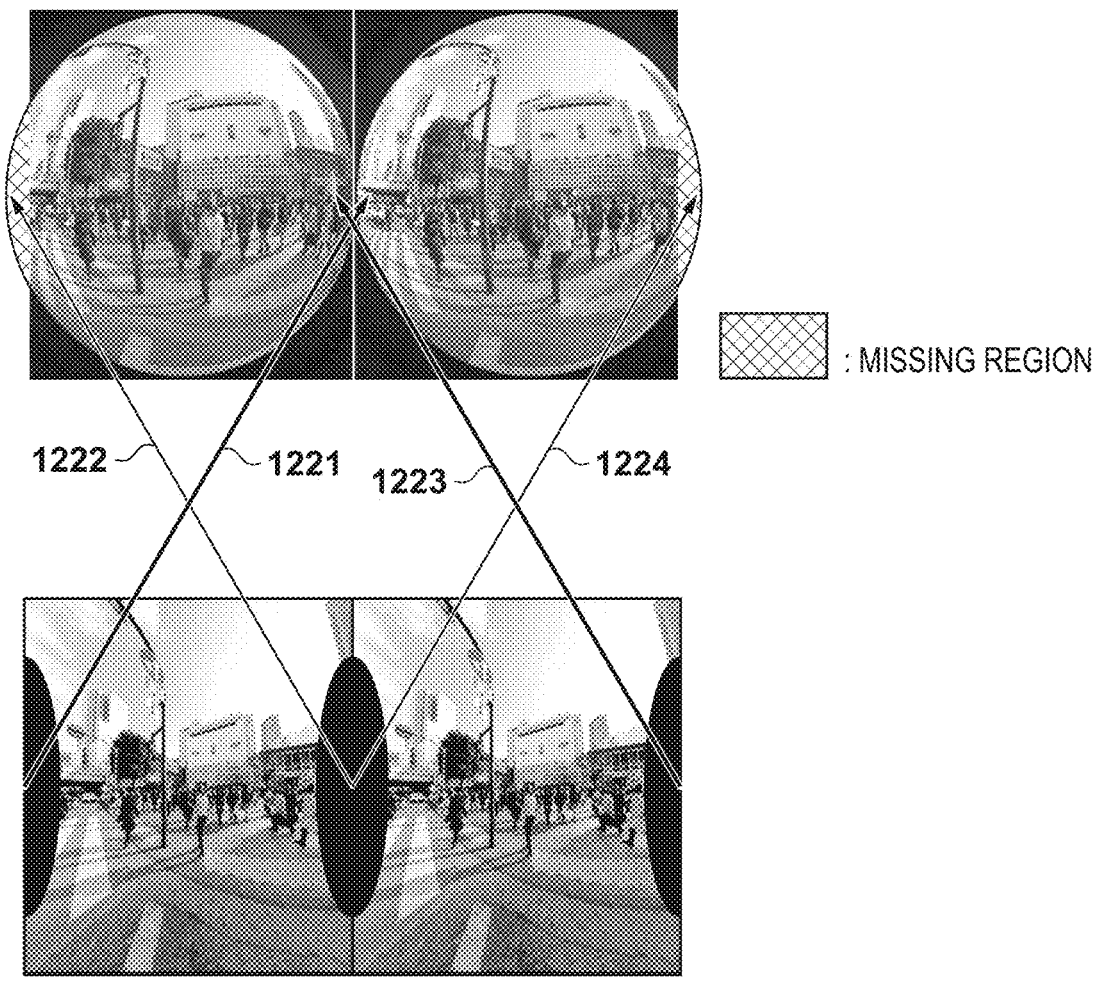
FIG. 12 is a conceptual diagram illustrating the processing of steps S712 and S1412 (equirectangular projection image generation processing).

The image at the top in FIG. 12 represents a circular fisheye image recorded with part missing, which is used as the transformation source image for the equirectangular projection. The image at the bottom in FIG. 12 represents a transformation destination image (transformation result image) for the equirectangular projection.

As indicated by the arrow 1221, the coordinates of the left end of the left eye equirectangular projection image correspond to the coordinates of the left end of the left eye circular fisheye image, and a pixel is recorded at the coordinates of the left end of the left eye circular fisheye image. On the other hand, although the starting point of the arrow 1222 in the right eye equirectangular projection image is in a position corresponding to the starting point of the arrow 1221 in the left eye equirectangular projection image, no pixel is recorded at the position indicated by the arrow 1222 in the right eye circular fisheye image (the coordinates of the left end of the right eye circular fisheye image). In this case, black is set for both the starting point of the arrow 1221 in the left eye equirectangular projection image and the starting point of the arrow 1222 in the right eye equirectangular projection image.

As indicated by the arrow 1223, the coordinates of the right end of the right eye equirectangular projection image correspond to the coordinates of the right end of the right eye circular fisheye image, and a pixel is recorded at the coordinates of the left end of the right eye circular fisheye image. On the other hand, although the starting point of the arrow 1224 in the left eye equirectangular projection image is in a position corresponding to the starting point of the arrow 1223 in the right eye equirectangular projection image, no pixel is recorded at the position indicated by the arrow 1224 in the left eye circular fisheye image (the coordinates of the right end of the left eye circular fisheye image). In this case, black is set for both the starting point of the arrow 1223 in the right eye equirectangular projection image and the starting point of the arrow 1224 in the left eye equirectangular projection image.

In this manner, for the left-eye equirectangular projection image, black is set in both a region (the starting point of the arrow 1224) corresponding to the missing region of the left-eye circular fisheye image (the ending point of the arrow 1224) as well as a region (the starting point of the arrow 1221) corresponding to a region (the ending point of the arrow 1221) in a position corresponding to the missing region in the right-eye circular fisheye image (the ending point of the arrow 1222). Likewise, for the right-eye equirectangular projection image, black is set in both a region (the starting point of the arrow 1222) corresponding to the missing region of the right-eye circular fisheye image (the ending point of the arrow 1222) as well as a region (the starting point of the arrow 1223) corresponding to a region (the ending point of the arrow 1223) in a position corresponding to the missing region in the left-eye circular fisheye image (the ending point of the arrow 1224). This makes it possible to suppress the occurrence of a region in which black pixels are present in only one of the left and right equirectangular projection images. Accordingly, the image quality can be improved when the user views the left and right equirectangular projection images as a single three-dimensional image through a head-mounted display (HMD).

Note that in the example of FIG. 12, a single RAW image includes a RAW image (a first RAW image) region including a region of the left-eye circular fisheye image (the first circular fisheye image) and a RAW image (a second RAW image) region including a region of the right-eye circular fisheye image (the second circular fisheye image). However, the control unit 501 may obtain a RAW image (the first RAW image) including a region of the left-eye circular fisheye image (the first circular fisheye image) and the RAW image (the second RAW image) region including a region of the right-eye circular fisheye image (the second circular fisheye image) as separate RAW images.

In step S827, the control unit 501 selects the next pixel as the pixel to be processed for each of the left eye transformation destination image and the right eye transformation destination image. For example, when processing from the upper-left pixel to the lower-right pixel of the left eye transformation destination image, the next pixel is the right-adjacent pixel in the same row. However, if the X coordinate of the right-adjacent pixel reaches the width of the left eye transformation destination image, the left end pixel one row below in the left eye transformation destination image is taken as the next pixel. The same applies for the right eye transformation destination image.

Through the processing described above, two equirectangular projection images are generated from two circular fisheye images having a missing region (a missing part).

According to the equirectangular projection image generation processing illustrated in FIG. 8, the control unit 501 develops the RAW image including the two circular fisheye images, but does not develop the pixels outside the regions of the circular fisheye images. In other words, the control unit 501 does not develop pixels in regions not referenced as transformation source coordinates in the equirectangular projection processing (the black region in the image at the bottom of FIG. 12). This makes it possible to reduce the burden of processing for development.

Additionally, the control unit 501 does not develop the pixels in a specific portion of the left-eye circular fisheye image (the ending point of the arrow 1221), in a position corresponding to the missing part of the right-eye circular fisheye image (the ending point of the arrow 1222 in FIG. 12). This is because black is set in step S826 for the region of the left-eye equirectangular projection image (the starting point of the arrow 1221) corresponding to the specific portion of the left-eye circular fisheye image (the ending point of the arrow 1221, and thus developed pixel values are not needed for the specific portion. Likewise, the control unit 501 does not develop the pixels in a specific portion of the right-eye circular fisheye image (the ending point of the arrow 1223), in a position corresponding to the missing part of the left-eye circular fisheye image (the ending point of the arrow 1224 in FIG. 12). This makes it possible to further reduce the burden of processing for development.

Incidentally, according to the equirectangular projection image generation processing illustrated in FIG. 8, the control unit 501 performs the developing processing and the equirectangular projection processing for each pixel to be processed in the processing loop of steps S821 to S827. In other words, the control unit 501 executes the developing processing and the equirectangular projection processing in parallel. However, the control unit 501 may perform the developing processing for the entire RAW image before the equirectangular projection processing. In this case, the control unit 501 may set a predetermined pixel value (e.g., a pixel value indicating black) for the pixels of the regions not subject to the developing processing. Here, the "regions not subject to the developing processing" are the black region at the top in FIG. 12, the specific portion of the right-eye circular fisheye image in the position corresponding to the missing part of the left-eye circular fisheye image, and the specific portion of the left-eye circular fisheye image in the position corresponding to the missing part of the right-eye circular fisheye image. Note that whether each pixel in the RAW image is within the circular fisheye region can be determined based on whether the pixel values of all four of the corresponding Bayer array pixels are less than or equal to a set level.

Image File Format

Figure 9:
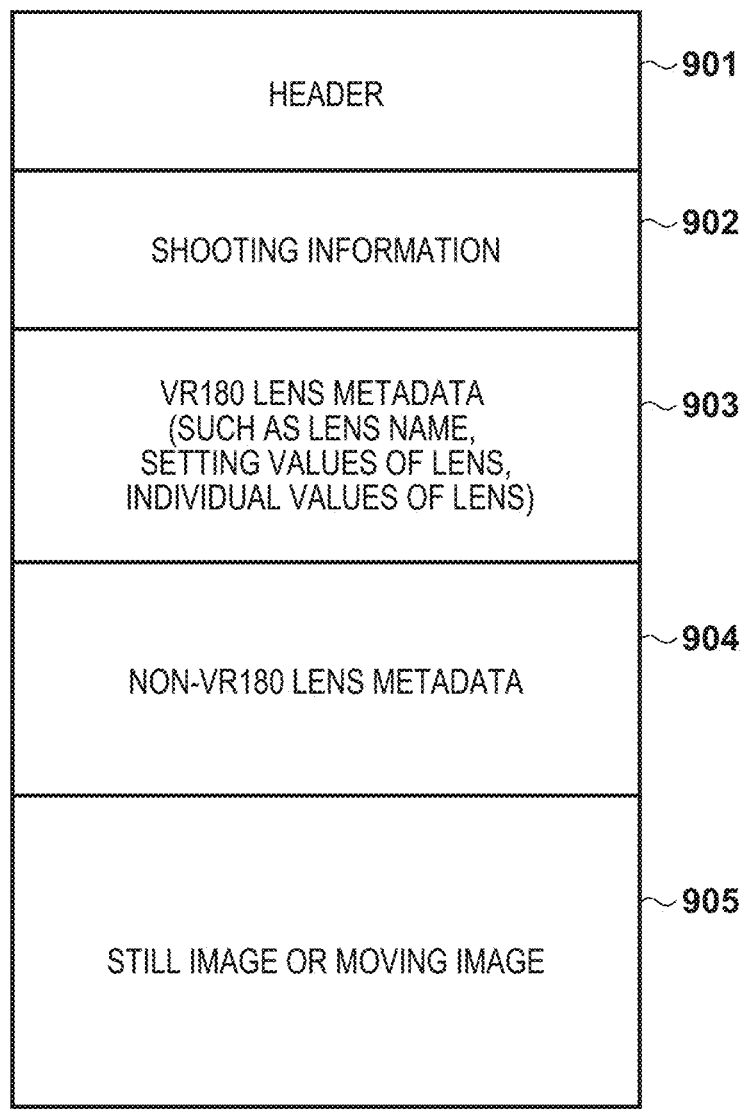
FIG. 9 is a diagram illustrating the structure of an image file (an image file processed by the PC 500) recorded by the camera 100.

The structure of the image file recorded by the camera 100 (the image file processed by the PC 500) will be described next with reference to FIG. 9. In FIG. 9, 901 indicates the header of the file. Information such as the type of the image is recorded in the header of the file. 902 indicates the shooting information at the time the image recorded in the file was shot. Information such as shutter speed, aperture, and the like is recorded in the shooting information. 903 indicates the VR180 lens metadata (the metadata about the VR180 lens). Information such as a lens name, a circular fisheye radius, and the like, as well as manufacturing error information and the like, are recorded as the VR180 lens metadata. 904 indicates non-VR180 lens metadata. Information which changes from frame to frame, for a moving image, and data required for development, for RAW, is recorded in the non-VR180 lens metadata. The lens name is recorded in the non-VR180 lens metadata for cameras having firmware that does not support VR180 lenses. 905 indicates still image or moving image data. In the case of a moving image, audio data is recorded in addition to the image.

In the example in FIG. 9, the shooting information 902, the VR180 lens metadata 903, and the non-VR180 lens metadata 904 are recorded in the image file. However, a configuration may also be employed in which the shooting information 902, the VR180 lens metadata 903, and the non-VR180 lens metadata 904 are recorded in a file that is different from the image file, and the recorded information is then associated with the image file.

Information Obtained from VR180 Lens 300 and Camera 100

An example of information obtained from the VR180 lens 300 by the camera 100 will be described with reference to FIG. 10A. The following information is obtained from the VR180 lens 300.

1. Lens design values
2. Individual lens values (manufacturing error values)
3. Lens flag information
4. Lens focal length information
5. Lens thermometer information The lens design values are design value data common to both VR180 eyes for aberration correction. The lens design values will be described in detail later with reference to FIG. 10B.

The individual lens values (manufacturing error values) is data that indicates manufacturing error of the VR180 lens 300. During the process of manufacturing the VR180 lens 300, errors occur on both the left and right sides. If the equirectangular projection processing by the PC 500 is performed with error present, the quality of the 3D display will drop. To suppress this problem, measurement results of errors detected during the lens manufacturing process are recorded in the lens. The individual lens values will be described in detail later with reference to FIG. 10B.

It is necessary for the PC 500 to determine whether or not to perform transformation processing on the image data captured by the VR180 lens 300 when performing image processing. A lens flag is recorded to make such a determination possible. The lens flag is a flag indicating that the image data was captured with a VR180 lens.

The lens focal length is the distance from a "principal point", which is the center of the lens, to the image formed on the image sensor. When the image data shot by the VR180 lens 300 undergoes transformation processing by the PC 500, a highly precise (in units of decimal points) value is required as the lens focal length in order to maintain the quality of the 3D display.

The lens thermometer information indicates the temperature of the VR180 lens 300. The lens temperature information is recorded at the time of shooting, and thus the PC 500 can determine the ambient temperature.

The lens design values and the individual lens values (the manufacturing error values) will be described with reference to FIG. 10B. This information is used in left-right swapping processing, equirectangular projection processing, and the like. The lens design values include, for example, the following information.

1. Image circle position
2. Image circle diameter
3. Angle of view
4. Distortion correction coefficient The image circle position is the design value of the center position of the image circle formed on the image sensor. For example, the image circle position is defined as coordinates in the horizontal direction and the vertical direction, with the mount as the origin.

The image circle diameter is the diameter of the image circle formed on the image sensor.

The angle of view is the range of the angle of view of the image formed in the image circle.

The distortion correction coefficient is the ratio of a design image height to an ideal image height of the lens. Values may be set for each image height and interpolated therebetween, or approximated by a polynomial expression.

In addition, when an application on the PC 500 is connected to the camera 100 and displayed, a magic window display is made on the screen of the PC 500. In this case, the "image circle position", the "image circle diameter", and the "angle of view" are used to maintain the attitude and the display quality. The PC 500 edits and uses this information to information suited to the application in order to properly display the image on the screen. For example, the PC 500 multiplies the "image circle position" and the "image circle diameter" by coefficients in accordance with the magic window display.

The individual lens values (manufacturing error values) include, for example, the following information.

5. Image circle position skew
6. Optical axis tilt
7. Image magnification skew

The image circle position skew is skew from the design value of the center position of the image circle formed on the image sensor. For example, the image circle position skew is defined by coordinates in the horizontal direction and the vertical direction, with the design position as the origin.

The optical axis tilt is skew in the orientation of the optical axis on the subject side. For example, horizontal direction tile skew and vertical direction tile skew are described in terms of angles.

The image magnification skew is skew of the image size from the design value. For example, the image magnification skew is described as a ratio to the design value.

These individual values are caused by manufacturing errors, such as lens eccentricity and tilt, and therefore vary from one lens to another. Accordingly, the individual lens values are measured and recorded for each of the left and right optical systems.

The metadata obtained from the camera 100 will be described with reference to FIG. 10C. This metadata is used to maintain 3D quality based on the display region and attitude information when transformation processing is performed by an application in the PC 500. The metadata includes, for example, the following information.

1. Camera recording region information
2. In-camera accelerometer information
3. Aperture value right eye correction information The camera recording region information is an effective image region. The effective image region that can be displayed depends on the image sensor and the recording mode of the camera. This information is used by the application in the PC 500 for more accurate image display during the transformation processing.

The in-camera accelerometer information is the roll and pitch of the attitude information, which is measured using an accelerometer (a level) within the camera. This information is used for electronic image stabilization and horizontal correction in the application in the PC 500.

The aperture value right eye correction information is an exposure setting value for left eye reference. This information is used to maintain 3D quality and perform playback display with no sense of discomfort when the transformation processing is performed by the application in the PC 500.

As described thus far, according to the first embodiment, the PC 500 obtains a RAW image including a region of a circular fisheye image (e.g., the top in FIG. 12), and develops the obtained RAW image. In developing the RAW image, the PC 500 does not develop pixels outside the region of the circular fisheye image in the RAW image (i.e., pixels in a region not referenced as the transformation source coordinates for the equirectangular projection processing (e.g., the pixels in the black region at the top in FIG. 12)). This makes it possible to reduce the burden of processing for development.

Additionally, the PC 500 may also skip developing the pixels in the specific portion of the first circular fisheye image (e.g., the region of the left-eye circular fisheye image corresponding to the ending point of the arrow 1221 in FIG. 12) in the position corresponding to the missing part of the second circular fisheye image (e.g., the missing part of the right-eye circular fisheye image corresponding to the ending point of the arrow 1222 in FIG. 12). This makes it possible to further reduce the burden of processing for development.

Second Embodiment

The first embodiment described a configuration in which the PC 500 obtains a RAW image from an image file including the RAW image. A second embodiment will describe a configuration in which the PC 500 obtains a RAW image by receiving a video signal including the RAW image from the camera 100 (an external apparatus) according to a predetermined video signal transmission standard. In the present embodiment, the basic configurations of the camera 100 and the PC 500 are similar to those of the first embodiment. The following will primarily describe areas that are different from the first embodiment.

Although the following will describe the HDMI standard as the video signal transmission standard, the video signal transmission standard of the present embodiment is not limited to the HDMI standard, and for example, the DisplayPort standard may be used.

Overall System Configuration

Figure 15:
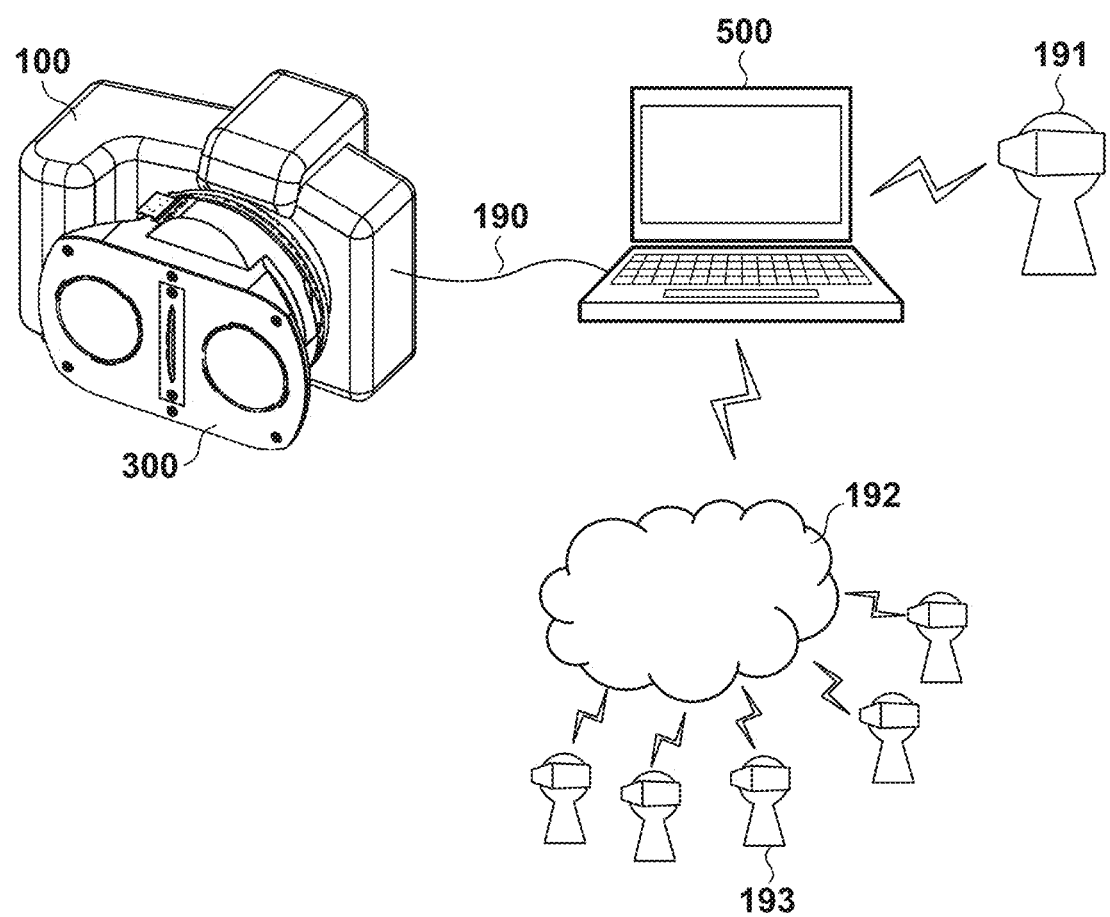
FIG. 15 is a diagram illustrating the overall configuration of a system according to one or more aspects of the present disclosure.

FIG. 15 is a diagram illustrating the overall configuration of a system according to the second embodiment. In FIG. 15, 190 indicates an HDMI cable that transmits a video signal output from the camera 100. The video signal from the camera 100 is input to the PC 500 via an external I/F 508. The PC 500 can display the video signal in real time in a display of the PC 500. The PC 500 can also convert the video signal into a streamable format, transmit video directly to an HMD 191 (head-mounted display) from the PC 500, deliver video to a plurality of users 193 over a cloud 192, and so on.

Video Signal Output Processing by Camera 100

Video signal output processing performed by the camera 100 will be described next with reference to FIGS. 13A and 13B. The processing in the flowcharts in FIGS. 13A and 13B starts when the user turns the camera 100 on.

The processing of steps S1301 to S1306 is similar to that of steps S601 to S606 in FIG. 6A, and will therefore not be described.

In step S1307, the system control unit 50 determines whether an HDMI cable is connected to an HDMI terminal (a video signal output I/F 240). The sequence moves to step S1308 if it is determined that an HDMI cable is connected, and to step S1305 if not.

The processing of steps S1308 and S1309 is similar to that of steps S608 and S609 in FIG. 6A, and will therefore not be described.

In step S1310, the system control unit 50 stores the data obtained in steps S1303, S1304, S1308, and S1309 in an HDMI signal output buffer in a predetermined format.

In step S1311, the system control unit 50 outputs the data stored in step S1310 as an HDMI signal.

In step S1312, the system control unit 50 determines whether the HDMI cable connected to the HDMI terminal (a video signal output I/F 240) has been removed. If it is determined that the HDMI cable has been removed, the processing of this flowchart ends. If the HDMI cable has not been removed, the sequence moves to step S1308. By repeating the processing of steps S1308 to S1312, the system control unit 50 can continue to output an HDMI signal from the camera 100.

Next, the case where the sequence moves from step S1301 or step S1302 to step S1322 will be described. Note that if the sequence has moved from step S1301 to step S1322, the firmware of the camera 100 is not compliant with a VR180 lens. Accordingly, the camera 100 cannot perform processing specific to the VR180 lens. As such, even if a VR180 lens is mounted to the camera 100, the camera 100 performs the same processing as when a normal lens is mounted.

The processing of steps S1322 to S1327 is similar to that of steps S622 to S627 in FIG. 6B, and will therefore not be described.

In step S1328, the system control unit 50 determines whether an HDMI cable is connected to an HDMI terminal (a video signal output I/F 240). The sequence moves to step S1329 if it is determined that an HDMI cable is connected, and to step S1326 if not.

The processing of steps S1329 and S1330 is similar to that of steps S629 and S630 in FIG. 6B, and will therefore not be described.

In step S1331, the system control unit 50 determines whether the general information on the lens is held in the system memory 218 (see step S1325). If the general information on the lens is held, the sequence moves to step S1332. If the general information on the lens is not held, the sequence moves to step S1333.

In step S1332, the system control unit 50 obtains the general information on the lens, held in the system memory 218.

In step S1333, the system control unit 50 stores the data obtained in steps S1329, S1330, and S1332 in an HDMI signal output buffer in a predetermined format.

In step S1334, the system control unit 50 outputs the data stored in step S1333 as an HDMI signal.

In step S1335, the system control unit 50 determines whether the HDMI cable connected to the HDMI terminal (a video signal output I/F 240) has been removed. If it is determined that the HDMI cable has been removed, the processing of this flowchart ends. If the HDMI cable has not been removed, the sequence moves to step S1329. By repeating the processing of steps S1329 to S1335, the system control unit 50 can continue to output an HDMI signal from the camera 100.

Figure 13A:
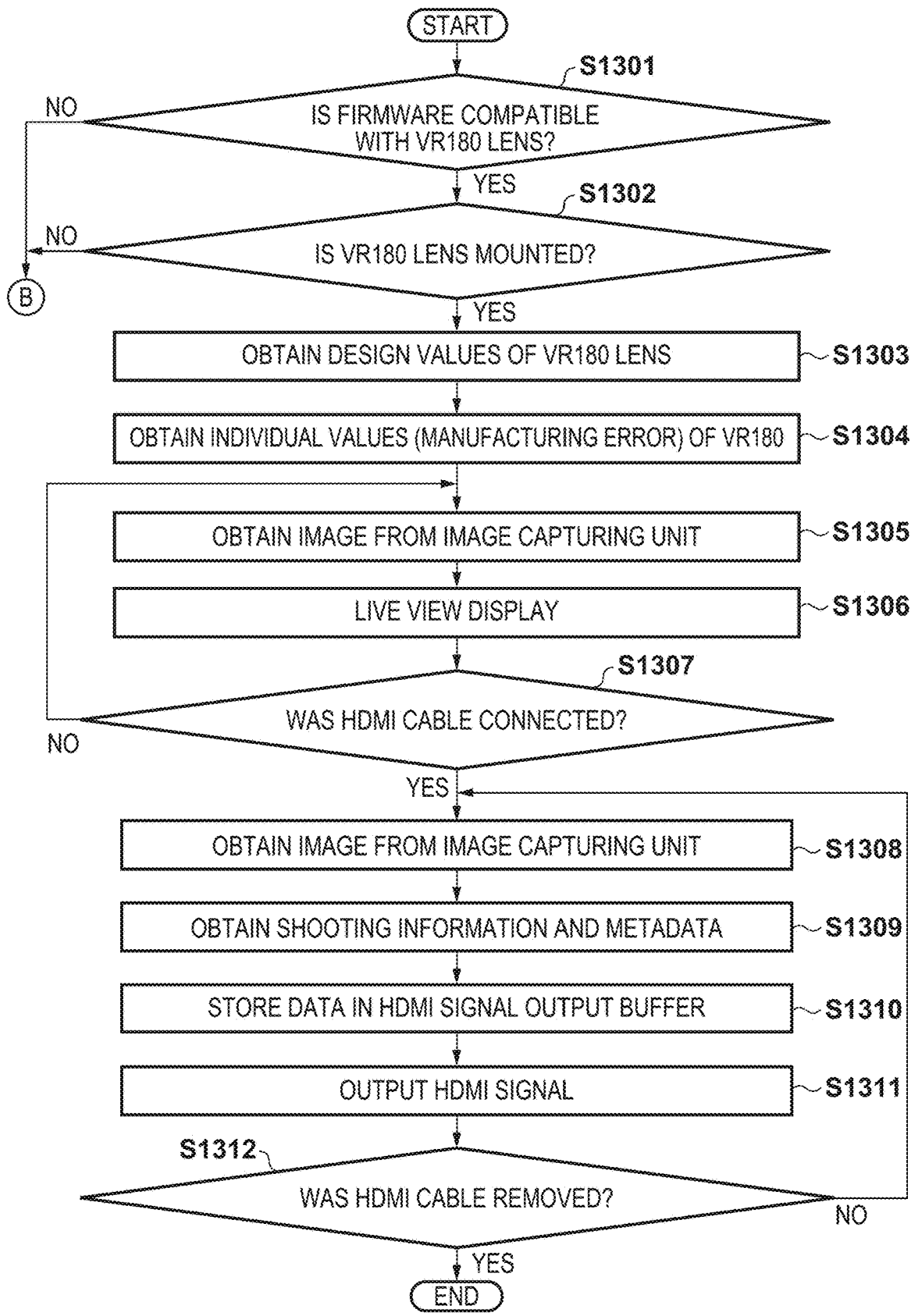
FIG. 13A is a flowchart illustrating video signal output processing by the camera 100 according to one or more aspects of the present disclosure.

Note that the RAW image shot in the flowcharts in FIGS. 13A and 13B may be a still image (a RAW still image) or a moving image (a RAW moving image).

Developing Processing and Equirectangular Projection Processing by PC 500

Figure 14:
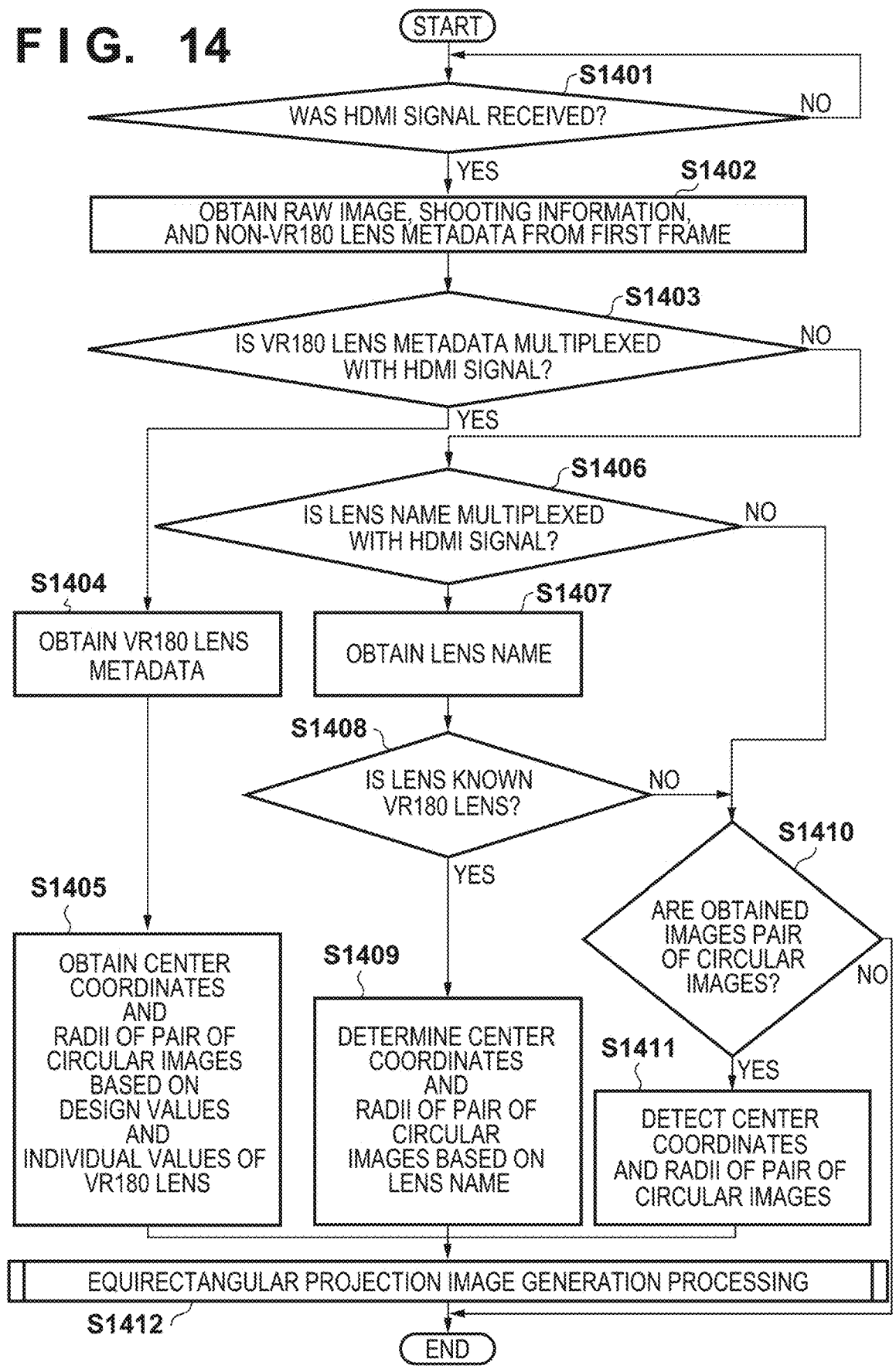
FIG. 14 is an overall flowchart illustrating developing processing and equirectangular projection processing by the PC 500 according to one or more aspects of the present disclosure.

The developing processing and the equirectangular projection processing performed by the PC 500 will be described with reference to FIG. 14. The PC 500 performs the developing processing and the equirectangular projection processing on the RAW image included in the video signal (the HDMI signal) received from the camera 100. As a result of the developing processing and the equirectangular projection processing, a pair of left and right equirectangular projection images are generated from a pair of left and right circular fisheye images such as those described with reference to FIGS. 11A and 11B. Note that in the example in FIG. 14, the developing processing is included in the processing of step S1412 (the equirectangular projection image generation processing).

In step S1401, the control unit 501 determines whether an HDMI signal has been received from the external apparatus (the camera 100). If an HDMI signal has been received, the sequence moves to step S1402. If an HDMI signal has not been received, the control unit 501 repeats the processing of step S1401.

In step S1402, the control unit 501 reads the RAW image, the shooting information, and the non-VR180 lens metadata from the first frame of the received HDMI signal.

In step S1403, the control unit 501 determines whether VR180 lens metadata is multiplexed with the HDMI signal. If VR180 lens metadata is multiplexed with the HDMI signal, the sequence moves to step S1404. If VR180 lens metadata is not multiplexed with the HDMI signal, the sequence moves to step S1406.

In step S1404, the control unit 501 reads the VR180 lens metadata from the HDMI signal.

Figure 7:
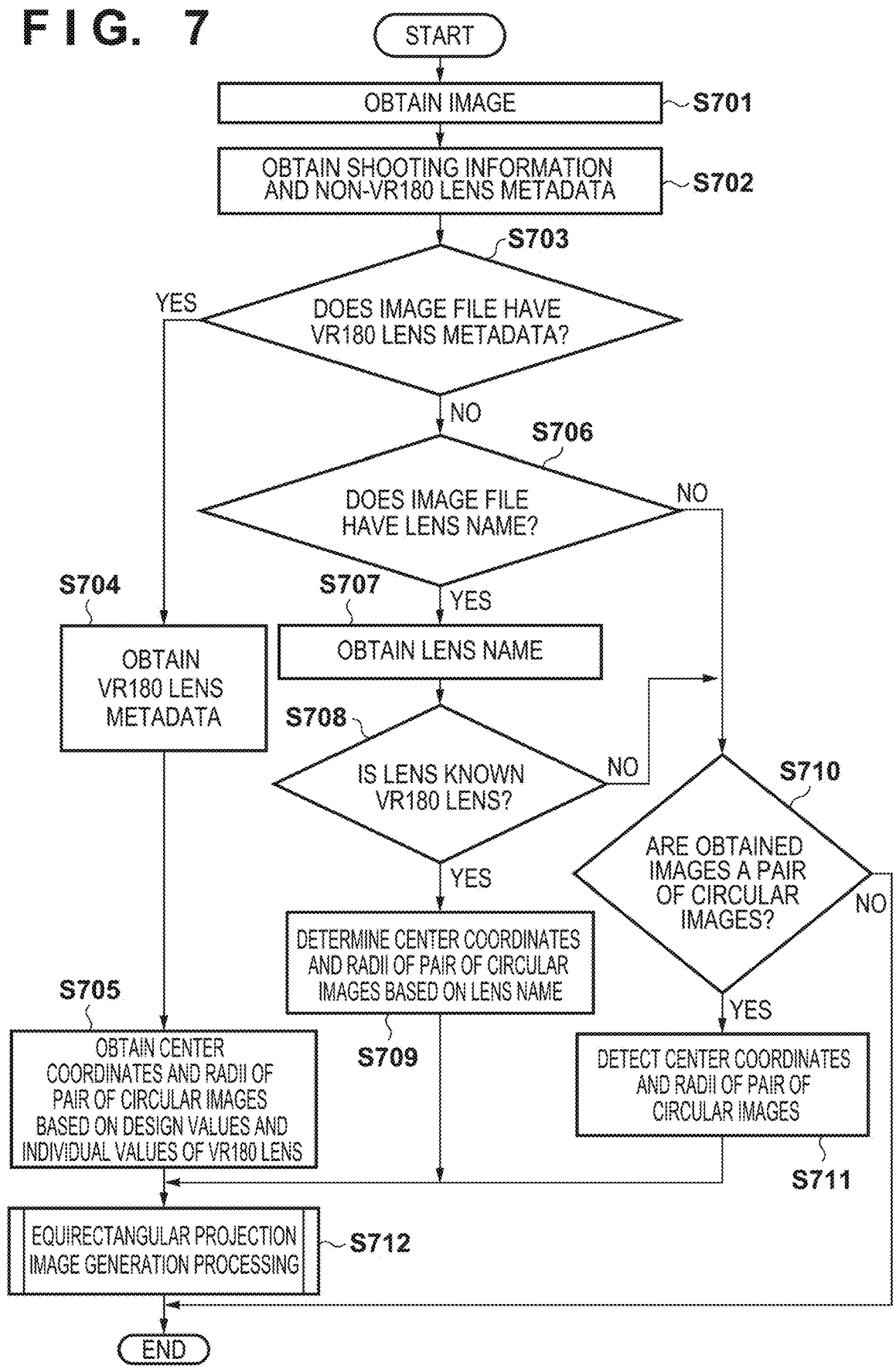
FIG. 7 is an overall flowchart illustrating developing processing and equirectangular projection processing by the PC 500 according to one or more aspects of the present disclosure.

The processing of step S1405 is similar to that of step S705 in FIG. 7, and will therefore not be described.

If the sequence has moved from step S1403 to step S1406, the control unit 501 determines whether the lens name is multiplexed with the HDMI signal. For example, if the camera 100 firmware does not support VR180 lenses, the camera 100 will not multiplex VR180 lens metadata, but may multiplex a lens name as non-VR180 lens metadata. If the lens name is multiplexed with the HDMI signal, the sequence moves to step S1407. If the lens name is not multiplexed with the HDMI signal, the sequence moves to step S1409.

In step S1407, the control unit 501 obtains the lens name from the HDMI signal.

In step S1408, the control unit 501 determines whether the lens name obtained in step S1407 indicates a known VR180 lens. If the lens name obtained in step S1407 indicates a known VR180 lens, the sequence moves to step S1409. If the lens name obtained in step S1407 does not indicate a known VR180 lens, the sequence moves to step S1410.

The processing of step S1409 is similar to that of step S709 in FIG. 7, and will therefore not be described.

If the sequence has moved from step S1406 or step S1408 to step S1410, the control unit 501 determines whether the image read in step S1402 is a pair of left and right circular fisheye images. For example, the control unit 501 generates a black-and-white binary image with respect to luminance values of the pixels in the read image, in which the pixel value of a pixel is black if the value is less than or equal to a threshold (a value near black) and the pixel value of a pixel is white if the value is greater than the threshold. The control unit 501 can then determine whether the image read in step S1402 is a pair of left and right circular fisheye images based on whether white regions of the black-and-white binary image are two circles. If the read image is a pair of left and right circular fisheye images, the sequence moves to step S1411. If the read image is not a pair of left and right circular fisheye images, the processing in this flowchart ends.

The processing of step S1411 is similar to that of step S711 in FIG. 7, and will therefore not be described.

In step S1412, the control unit 501 uses the center coordinates and radii of the two circular fisheye images obtained by the processing in step S1405, step S1409, or step S1411, and generates an equirectangular projection image from the two circular fisheye images. The details of the processing in step S1412 are similar to those of the processing in step S712 in FIG. 7 (i.e., the processing of the flowchart in FIG. 8), and will therefore not be described.

The processing of the flowchart in FIG. 8 is repeatedly executed on the subsequent frames of the HDMI signal until the control unit 501 detects the end of the HDMI signal.

Through the processing described above, two equirectangular projection images are generated from two circular fisheye images having a missing region (a missing part).

As described thus far, according to the second embodiment, the PC 500 receives a video signal including a RAW image including a circular fisheye image region from the camera 100 according to the HDMI standard, and obtains the RAW image from the received video signal. The PC 500 then develops the RAW image using a method that skips the development of some pixels, similar to the first embodiment. Accordingly, even if the PC 500 obtains a RAW image from a video signal (instead of an image file), the processing load for development can be reduced, similar to the first embodiment.

The foregoing embodiments described configurations in which the RAW image developing processing, the swapping of the left and right circular fisheye images, and the equirectangular projection processing are performed at once. However, a configuration may be employed in which the developing processing and the equirectangular projection processing are performed after swapping the left and right circular fisheye images while in a Bayer image (RAW image) state. Alternatively, a configuration may be employed in which the left and right images are swapped in an RGB image state after performing the developing processing and the equirectangular projection for the required pixels.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-099616, filed Jun. 15, 2021 which is hereby incorporated by reference herein in its entirety.

What is claimed is:
1. An image processing apparatus comprising:
a processor; and
a memory storing a program which, when executed by the processor, causes the image processing apparatus to:
obtain a first RAW image and a second RAW image; and
develop the first RAW image,
wherein the first RAW image includes a region of a first circular fisheye image,
wherein the second RAW image includes a region of a second circular fisheye image which has parallax with respect to the first circular fisheye image and which is accompanied by a missing part in which no pixel value is present,
wherein a pixel outside the region of the first circular fisheye image in the first RAW image is not developed, and
wherein a pixel in a specific portion of the first circular fisheye image is not developed, the specific portion being in a position corresponding to the missing part of the second circular fisheye image.

2. The image processing apparatus according to claim 1, wherein the first RAW image and the second RAW image are obtained by obtaining a single RAW image including a region of the first RAW image and a region of the second RAW image.

3. The image processing apparatus according to claim 1, wherein a predetermined pixel value is set for the pixel in the first RAW image that is not developed.

4. The image processing apparatus according to claim 1, wherein the program further causes the image processing apparatus to:
generate an equirectangular projection image by performing equirectangular projection processing based on the first circular fisheye image,
wherein in the equirectangular projection processing, a pixel in the first circular fisheye image that corresponds to a pixel to be processed in the equirectangular projection image is identified, and a pixel value obtained by developing the identified pixel is set for the pixel to be processed in the equirectangular projection image.

5. The image processing apparatus according to claim 1, wherein the first RAW image is obtained from an image file including the first RAW image.

6. The image processing apparatus according to claim 1, the program further causes the image processing apparatus to:
receive a video signal including the first RAW image from an external apparatus according to a predetermined video signal transmission standard,
wherein the first RAW image is obtained from the video signal.

7. The image processing apparatus according to claim 1, wherein the circular fisheye image is a circular region included in the RAW image.

8. An image processing method executed by an image processing apparatus comprising:
obtaining a first RAW image and a second RAW image; and
developing the first RAW image,
wherein the first RAW image includes a region of a first circular fisheye image,
wherein the second RAW image includes a region of a second circular fisheye image which has parallax with respect to the first circular fisheye image and which is accompanied by a missing part in which no pixel value is present,
wherein a pixel outside the region of the first circular fisheye image in the first RAW image is not developed, and
wherein a pixel in a specific portion of the first circular fisheye image is not developed, the specific portion being in a position corresponding to the missing part of the second circular fisheye image.

9. A non-transitory computer-readable storage medium which stores a program for causing a computer to execute an image processing method, the method comprising:
obtaining a first RAW image and a second RAW image; and
developing the first RAW image, wherein the first RAW image includes a region of a first circular fisheye image, wherein the second RAW image includes a region of a second circular fisheye image which has parallax with respect to the first circular fisheye image and which is accompanied by a missing part in which no pixel value is present, wherein a pixel outside the region of the first circular fisheye image in the first RAW image is not developed, and wherein a pixel in a specific portion of the first circular fisheye image is not developed, the specific portion being in a position corresponding to the missing part of the second circular fisheye image.

* * * * *